(12) United States Patent
Jones

(10) Patent No.: US 7,793,846 B2
(45) Date of Patent: Sep. 14, 2010

(54) SYSTEMS, COMPOSITIONS, AND METHODS FOR FULL COLOR LASER ENGRAVING OF ID DOCUMENTS

(75) Inventor: Robert Jones, Andover, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 363 days.

(21) Appl. No.: 10/330,034

(22) Filed: Dec. 24, 2002

(65) Prior Publication Data

US 2003/0234292 A1 Dec. 25, 2003

Related U.S. Application Data

(60) Provisional application No. 60/344,674, filed on Dec. 24, 2001.

(51) Int. Cl.
G06K 19/06 (2006.01)
(52) U.S. Cl. .................. 235/491; 235/468; 235/494; 346/74.7
(58) Field of Classification Search ................. 235/494, 235/487, 488, 468, 491; 283/94; 346/74.7, 346/76.1, 135.1, 136; 428/1.3–1.31, 32.24, 428/32.25, 32.34, 32.35, 32.69, 32.75, 32.76, 428/32.77
See application file for complete search history.

(56) References Cited

U.S. PATENT DOCUMENTS

| | | |
|---|---|---|
| 2,815,310 A | 12/1957 | Anderson |
| 3,153,166 A | 10/1964 | Thornton, Jr. et al. |
| 3,225,457 A | 12/1965 | Schure |
| 3,238,595 A | 3/1966 | Schwartz |
| 3,413,171 A | 11/1968 | Hannon |
| 3,496,262 A | 2/1970 | Long et al. |

(Continued)

FOREIGN PATENT DOCUMENTS

CA 2235002 12/1998

(Continued)

OTHER PUBLICATIONS

PCT—Notification of Transmittal of the International Search Report or the Declaration, for International Application No. PCT/USO2/41644, mailed on May 30, 2003.

(Continued)

*Primary Examiner*—Seung H Lee
(74) *Attorney, Agent, or Firm*—Mintz Levin Cohn Ferris Glovsky & Popeo PC

(57) ABSTRACT

In one embodiment, the invention provides a method for forming a full color laser engraved image on an ID card. As described below, a special image capable layer is prepared that is addressable by one or more near infrared (NIR) lasers. Each type of particle contained within the image capable layer is associated with a particular color (e.g., cyan, magenta, or yellow) and is responsive (i.e., can selectively absorb) a particular wavelength of laser energy to form a laser engraved pixel in that respective color. In one embodiment, the particles are selected such that the wavelengths that they respond to do not overlap significantly. By providing discrete physical particles and preventing a given particle from responding to more than one laser wavelength, it can be possible to minimize so-called "cross talk" between the cyan, magenta, and yellow centers and minimize contamination and/or chemical mixing of image formers. This helps to ensure image accuracy and quality.

35 Claims, 4 Drawing Sheets

U.S. PATENT DOCUMENTS

| | | |
|---|---|---|
| 3,569,619 A | 3/1971 | Simjian |
| 3,571,957 A | 3/1971 | Cumming et al. |
| 3,582,439 A | 6/1971 | Thomas |
| 3,601,913 A | 8/1971 | Pollock |
| 3,614,839 A | 10/1971 | Thomas |
| 3,647,275 A | 3/1972 | Ward |
| 3,665,162 A | 5/1972 | Yamamoto et al. |
| 3,703,628 A | 11/1972 | Philipson, Jr. |
| 3,758,970 A | 9/1973 | Annenberg |
| 3,802,101 A | 4/1974 | Scantlin |
| 3,805,238 A | 4/1974 | Rothfjell |
| 3,838,444 A | 9/1974 | Loughlin et al. |
| 3,845,391 A | 10/1974 | Crosby |
| 3,860,558 A | 1/1975 | Klemchuk |
| 3,914,877 A | 10/1975 | Hines |
| 3,922,074 A | 11/1975 | Ikegami et al. |
| 3,929,701 A | 12/1975 | Hall |
| 3,949,501 A | 4/1976 | Andrews et al. |
| 3,953,869 A | 4/1976 | Wah Lo et al. |
| 3,961,956 A | 6/1976 | Fukuda et al. |
| 3,975,291 A | 8/1976 | Claussen et al. |
| 3,984,624 A | 10/1976 | Waggener |
| 4,035,740 A | 7/1977 | Schafer et al. |
| 4,051,374 A * | 9/1977 | Drexhage et al. ...... 250/370.08 |
| 4,072,911 A | 2/1978 | Walther et al. |
| 4,082,873 A | 4/1978 | Williams |
| 4,096,015 A | 6/1978 | Kawamata et al. |
| 4,097,279 A | 6/1978 | Whitehead |
| 4,100,509 A | 7/1978 | Walther et al. |
| 4,119,361 A | 10/1978 | Greenaway |
| 4,121,003 A | 10/1978 | Williams |
| 4,131,337 A | 12/1978 | Moraw et al. |
| 4,155,618 A | 5/1979 | Regnault et al. |
| 4,171,766 A | 10/1979 | Ruell |
| 4,184,701 A | 1/1980 | Franklin et al. |
| 4,225,967 A | 9/1980 | Miwa et al. |
| 4,230,990 A | 10/1980 | Lert, Jr. et al. |
| 4,231,113 A | 10/1980 | Blasbalg |
| 4,238,849 A | 12/1980 | Gassmann |
| 4,252,995 A | 2/1981 | Schmidt et al. |
| 4,256,900 A | 3/1981 | Raue |
| 4,270,130 A * | 5/1981 | Houle et al. ............... 346/77 E |
| 4,271,395 A | 6/1981 | Brinkmann et al. |
| 4,274,062 A | 6/1981 | Brinkmann et al. |
| 4,289,957 A | 9/1981 | Neyroud et al. |
| 4,301,091 A | 11/1981 | Schieder et al. |
| 4,304,809 A | 12/1981 | Moraw et al. |
| 4,313,197 A | 1/1982 | Maxemchuk |
| 4,313,984 A | 2/1982 | Moraw et al. |
| 4,317,782 A | 3/1982 | Eckstein et al. |
| 4,324,421 A | 4/1982 | Moraw et al. |
| 4,326,066 A | 4/1982 | Eckstein et al. |
| 4,338,258 A | 7/1982 | Brinkwerth et al. |
| 4,356,052 A | 10/1982 | Moraw et al. |
| 4,367,488 A | 1/1983 | Leventer et al. |
| 4,379,947 A | 4/1983 | Warner |
| 4,380,027 A | 4/1983 | Leventer et al. |
| 4,384,973 A | 5/1983 | Harnisch |
| 4,395,600 A | 7/1983 | Lundy et al. |
| 4,415,225 A | 11/1983 | Benton et al. |
| 4,417,784 A | 11/1983 | Knop et al. |
| 4,423,415 A | 12/1983 | Goldman |
| 4,425,642 A | 1/1984 | Moses et al. |
| 4,443,453 A | 4/1984 | Trijzelaar et al. |
| 4,450,024 A | 5/1984 | Haghiri-Tehrani et al. |
| 4,467,209 A | 8/1984 | Maurer et al. |
| 4,468,468 A | 8/1984 | Benninghoven et al. |
| 4,506,148 A | 3/1985 | Berthold et al. |
| 4,507,346 A | 3/1985 | Maurer et al. |
| 4,510,311 A | 4/1985 | Eckstein |
| 4,522,881 A | 6/1985 | Kobayashi et al. |
| 4,523,777 A | 6/1985 | Heyrana et al. |
| 4,527,059 A | 7/1985 | Benninghoven et al. |
| 4,528,588 A | 7/1985 | Lofberg |
| 4,529,992 A | 7/1985 | Ishida et al. |
| 4,532,508 A | 7/1985 | Ruell |
| 4,544,181 A | 10/1985 | Maurer et al. |
| 4,547,804 A | 10/1985 | Greenberg |
| 4,551,265 A | 11/1985 | Brinkwerth et al. |
| 4,553,261 A | 11/1985 | Froessl |
| 4,568,824 A | 2/1986 | Gareis et al. |
| 4,579,754 A | 4/1986 | Maurer et al. |
| 4,590,366 A | 5/1986 | Rothfjell |
| 4,595,950 A | 6/1986 | Lofberg |
| 4,596,409 A | 6/1986 | Holbein et al. |
| 4,597,592 A | 7/1986 | Maurer et al. |
| 4,597,593 A | 7/1986 | Maurer |
| 4,599,259 A | 7/1986 | Kobayashi et al. |
| 4,617,216 A | 10/1986 | Haghiri-Tehrani et al. |
| 4,621,271 A | 11/1986 | Brownstein |
| 4,627,997 A | 12/1986 | Ide |
| 4,629,215 A | 12/1986 | Maurer et al. |
| 4,637,051 A | 1/1987 | Clark |
| 4,637,896 A | 1/1987 | Shannon |
| 4,643,453 A | 2/1987 | Shapiro et al. |
| 4,652,722 A | 3/1987 | Stone et al. .................. 219/121 |
| 4,653,775 A | 3/1987 | Raphael et al. |
| 4,653,862 A | 3/1987 | Morozumi |
| 4,654,290 A | 3/1987 | Spanjer |
| 4,654,867 A | 3/1987 | Labedz et al. |
| 4,660,221 A | 4/1987 | Dlugos |
| 4,663,518 A * | 5/1987 | Borror et al. ................. 235/487 |
| 4,665,431 A | 5/1987 | Cooper |
| 4,670,882 A | 6/1987 | Telle et al. |
| 4,672,605 A | 6/1987 | Hustig et al. |
| 4,672,891 A | 6/1987 | Maurer et al. |
| 4,675,746 A | 6/1987 | Tetrick et al. |
| 4,677,435 A | 6/1987 | D'Agraives et al. |
| 4,682,794 A | 7/1987 | Margolin |
| 4,687,526 A | 8/1987 | Wilfert |
| 4,689,477 A | 8/1987 | Goldman |
| 4,703,476 A | 10/1987 | Howard |
| 4,711,690 A | 12/1987 | Haghiri-Tehrani |
| 4,712,103 A | 12/1987 | Gotanda |
| 4,718,106 A | 1/1988 | Weinblatt |
| 4,732,410 A | 3/1988 | Holbein et al. ................. 283/67 |
| 4,735,670 A | 4/1988 | Maurer et al. |
| 4,738,949 A | 4/1988 | Sethi et al. |
| 4,739,377 A | 4/1988 | Allen |
| 4,745,267 A | 5/1988 | Davis et al. |
| 4,748,452 A | 5/1988 | Maurer |
| 4,750,173 A | 6/1988 | Bluthgen |
| 4,751,525 A | 6/1988 | Robinson |
| 4,754,128 A | 6/1988 | Takeda et al. |
| 4,765,636 A | 8/1988 | Becker et al. |
| 4,765,656 A | 8/1988 | Becker et al. |
| 4,765,999 A | 8/1988 | Winter |
| 4,766,026 A | 8/1988 | Lass et al. |
| 4,773,677 A | 9/1988 | Plasse |
| 4,775,901 A | 10/1988 | Nakano |
| 4,776,013 A | 10/1988 | Kafri et al. |
| 4,803,114 A | 2/1989 | Schledorn |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,816,372 A | 3/1989 | Schenk et al. |
| 4,816,374 A | 3/1989 | Lecomte |
| 4,820,912 A | 4/1989 | Samyn |
| 4,822,973 A | 4/1989 | Fahner et al. |
| 4,835,517 A | 5/1989 | van der Gracht et al. |
| 4,841,134 A | 6/1989 | Hida et al. |
| 4,855,827 A | 8/1989 | Best |
| 4,861,620 A | 8/1989 | Azuma et al. ............... 427/53.1 |

| | | | | | | |
|---|---|---|---|---|---|---|
| 4,864,618 A | 9/1989 | Wright et al. | | 5,148,498 A | 9/1992 | Resnikoff |
| 4,866,025 A | 9/1989 | Byers et al. | | 5,150,409 A | 9/1992 | Elsner |
| 4,866,027 A | 9/1989 | Henzel | | 5,156,938 A | 10/1992 | Foley et al. |
| 4,866,771 A | 9/1989 | Bain | | 5,157,424 A | 10/1992 | Craven et al. |
| 4,869,946 A | 9/1989 | Clay | | 5,161,210 A | 11/1992 | Druyvesteyn et al. |
| 4,871,714 A | 10/1989 | Byers et al. | | 5,166,676 A | 11/1992 | Milheiser |
| 4,876,234 A | 10/1989 | Henzel | | 5,169,707 A | 12/1992 | Faykish et al. |
| 4,876,237 A | 10/1989 | Byers et al. | | 5,171,625 A | 12/1992 | Newton |
| 4,876,617 A | 10/1989 | Best et al. | | 5,173,840 A | 12/1992 | Kodai et al. |
| 4,879,747 A | 11/1989 | Leighton et al. | | 5,179,392 A | 1/1993 | Kawaguchi ................. 346/108 |
| 4,884,139 A | 11/1989 | Pommier | | 5,181,786 A | 1/1993 | Hujink |
| 4,888,798 A | 12/1989 | Earnest | | 5,185,736 A | 2/1993 | Tyrrell et al. |
| 4,889,749 A | 12/1989 | Ohashi et al. | | 5,199,081 A | 3/1993 | Saito et al. |
| 4,891,351 A | 1/1990 | Byers et al. | | 5,200,822 A | 4/1993 | Bronfin et al. |
| 4,894,110 A | 1/1990 | Lass et al. | | 5,208,450 A | 5/1993 | Uenishi et al. |
| 4,903,301 A | 2/1990 | Kondo et al. | | 5,212,551 A | 5/1993 | Conanan |
| 4,908,836 A | 3/1990 | Rushforth et al. | | 5,213,337 A | 5/1993 | Sherman |
| 4,908,873 A | 3/1990 | Philibert et al. | | 5,215,864 A | 6/1993 | Laakman .................... 430/293 |
| 4,921,278 A | 5/1990 | Shiang et al. | | 5,216,543 A | 6/1993 | Calhoun |
| 4,935,335 A | 6/1990 | Fotland | | 5,228,056 A | 7/1993 | Schilling |
| 4,939,515 A | 7/1990 | Adelson | | 5,237,164 A | 8/1993 | Takada |
| 4,941,150 A | 7/1990 | Iwasaki | | 5,243,423 A | 9/1993 | DeJean et al. |
| 4,943,973 A | 7/1990 | Werner | | 5,245,329 A | 9/1993 | Gokcebay |
| 4,943,976 A | 7/1990 | Ishigaki | | 5,253,078 A | 10/1993 | Balkanski et al. |
| 4,944,036 A | 7/1990 | Hyatt | | 5,258,998 A | 11/1993 | Koide |
| 4,947,028 A | 8/1990 | Gorog | | 5,259,025 A | 11/1993 | Monroe et al. |
| 4,959,406 A | 9/1990 | Foltin et al. | | 5,261,987 A | 11/1993 | Luening et al. |
| 4,963,998 A | 10/1990 | Maufe | | 5,262,860 A | 11/1993 | Fitzpatrick |
| 4,965,827 A | 10/1990 | McDonald | | 5,267,334 A | 11/1993 | Normille et al. |
| 4,967,273 A | 10/1990 | Greenberg | | 5,267,755 A | 12/1993 | Yamauchi et al. |
| 4,968,063 A | 11/1990 | McConville et al. | | 5,270,526 A | 12/1993 | Yoshihara |
| 4,969,041 A | 11/1990 | O'Grady et al. | | 5,272,039 A * | 12/1993 | Yoerger ................. 430/111.34 |
| 4,972,471 A | 11/1990 | Gross et al. | | 5,276,478 A | 1/1994 | Morton |
| 4,972,476 A | 11/1990 | Nathans | | 5,280,537 A | 1/1994 | Sugiyama et al. |
| 4,977,594 A | 12/1990 | Shear | | 5,284,364 A | 2/1994 | Jain |
| 4,979,210 A | 12/1990 | Nagata et al. | | 5,288,976 A | 2/1994 | Citron |
| 4,990,759 A | 2/1991 | Gloton et al. | | 5,293,399 A | 3/1994 | Hefti |
| 4,993,068 A | 2/1991 | Piosenka et al. | | 5,294,774 A | 3/1994 | Stone .................... 219/121.77 |
| 4,996,530 A | 2/1991 | Hilton | | 5,294,944 A | 3/1994 | Taekyama et al. ........... 346/108 |
| 4,999,065 A | 3/1991 | Wilfert | | 5,295,203 A | 3/1994 | Krause et al. |
| 5,005,872 A | 4/1991 | Lass et al. ...................... 283/85 | | 5,298,922 A * | 3/1994 | Merkle et al. ................ 347/262 |
| 5,005,873 A | 4/1991 | West | | 5,299,019 A | 3/1994 | Pack et al. |
| 5,006,503 A | 4/1991 | Byers et al. | | 5,301,981 A | 4/1994 | Nesis |
| 5,010,405 A | 4/1991 | Schreiber et al. | | 5,304,400 A | 4/1994 | Bultera |
| 5,011,816 A | 4/1991 | Byers et al. | | 5,304,513 A | 4/1994 | Haghiri-Tehrani et al. |
| 5,013,900 A | 5/1991 | Hoppe | | 5,304,789 A | 4/1994 | Lob et al. |
| 5,023,907 A | 6/1991 | Johnson | | 5,315,098 A | 5/1994 | Tow |
| 5,024,989 A | 6/1991 | Chiang et al. | | 5,319,453 A | 6/1994 | Copriviza et al. |
| 5,027,401 A | 6/1991 | Soltesz | | 5,319,724 A | 6/1994 | Blonstein et al. |
| 5,036,513 A | 7/1991 | Greenblatt | | 5,319,735 A | 6/1994 | Preuss et al. |
| 5,053,956 A | 10/1991 | Donald | | 5,321,751 A | 6/1994 | Ray et al. |
| 5,060,981 A | 10/1991 | Fossum et al. | | 5,325,167 A | 6/1994 | Melen |
| 5,061,341 A | 10/1991 | Kildal et al. ................. 428/913 | | 5,334,573 A | 8/1994 | Schild |
| 5,063,446 A | 11/1991 | Gibson | | 5,336,657 A | 8/1994 | Egashira et al. |
| 5,066,947 A | 11/1991 | Du Castel | | 5,337,361 A | 8/1994 | Wang et al. |
| 5,073,899 A | 12/1991 | Collier et al. | | 5,351,302 A | 9/1994 | Leighton et al. |
| 5,075,195 A | 12/1991 | Babler et al. | | 5,374,675 A | 12/1994 | Plachetta et al. |
| 5,079,411 A | 1/1992 | Lee | | 5,379,345 A | 1/1995 | Greenberg |
| 5,079,648 A | 1/1992 | Maufe | | 5,380,044 A | 1/1995 | Aitkens et al. |
| 5,086,469 A | 2/1992 | Gupta et al. | | 5,380,695 A | 1/1995 | Chiang et al. |
| 5,087,507 A | 2/1992 | Heinzer | | 5,384,846 A | 1/1995 | Berson et al. |
| 5,089,350 A | 2/1992 | Talvalkar et al. | | 5,385,371 A | 1/1995 | Izawa |
| 5,095,196 A | 3/1992 | Miyata | | 5,387,013 A | 2/1995 | Yamauchi et al. |
| 5,100,711 A * | 3/1992 | Satake et al. ................ 428/64.8 | | 5,393,099 A | 2/1995 | D'Amato |
| 5,103,459 A | 4/1992 | Gilhousen et al. | | 5,394,274 A | 2/1995 | Kahn |
| 5,113,445 A | 5/1992 | Wang | | 5,399,847 A | 3/1995 | Droz |
| 5,113,518 A | 5/1992 | Durst | | 5,404,377 A | 4/1995 | Moses |
| 5,122,813 A | 6/1992 | Lass et al. | | 5,408,542 A | 4/1995 | Callahan |
| 5,128,779 A | 7/1992 | Mallik | | 5,409,797 A | 4/1995 | Hosoi et al. |
| 5,138,070 A | 8/1992 | Berneth | | 5,421,619 A | 6/1995 | Dyball |
| 5,138,604 A | 8/1992 | Umeda et al. | | 5,421,869 A | 6/1995 | Gundjian et al. |
| 5,138,712 A | 8/1992 | Corbin | | 5,422,230 A * | 6/1995 | Boggs et al. ................. 430/338 |
| 5,146,457 A | 9/1992 | Veldhuis et al. | | 5,422,963 A | 6/1995 | Chen et al. |

| | | | | | |
|---|---|---|---|---|---|
| 5,422,995 A | 6/1995 | Aoki et al. | 5,680,223 A | 10/1997 | Cooper et al. |
| 5,428,607 A | 6/1995 | Hiller et al. | 5,681,356 A | 10/1997 | Barak et al. |
| 5,428,731 A | 6/1995 | Powers | 5,683,774 A | 11/1997 | Faykish et al. |
| 5,432,870 A | 7/1995 | Schwartz | 5,684,885 A | 11/1997 | Cass et al. |
| 5,446,273 A | 8/1995 | Leslie | 5,687,236 A | 11/1997 | Moskowitz et al. |
| 5,448,053 A | 9/1995 | Rhoads | 5,689,620 A | 11/1997 | Kopec et al. |
| 5,449,200 A | 9/1995 | Andric et al. | 5,691,757 A | 11/1997 | Hayashihara et al. ....... 347/155 |
| 5,450,490 A | 9/1995 | Jensen et al. | 5,694,471 A | 12/1997 | Chen et al. |
| 5,451,478 A * | 9/1995 | Boggs et al. ................. 430/11 | 5,697,006 A | 12/1997 | Taguchi et al. |
| 5,454,598 A | 10/1995 | Wicker | 5,698,296 A * | 12/1997 | Dotson et al. ............ 428/195.1 |
| 5,458,713 A | 10/1995 | Ojster | 5,700,037 A | 12/1997 | Keller |
| 5,463,209 A | 10/1995 | Figh | 5,706,364 A | 1/1998 | Kopec et al. |
| 5,463,212 A | 10/1995 | Oshima et al. | 5,712,731 A | 1/1998 | Drinkwater et al. |
| 5,466,012 A * | 11/1995 | Puckett et al. ................. 283/67 | 5,714,291 A | 2/1998 | Marinello et al. |
| 5,469,506 A | 11/1995 | Berson et al. | 5,715,403 A | 2/1998 | Stefik |
| 5,471,533 A | 11/1995 | Wang et al. | 5,717,018 A | 2/1998 | Magerstedt et al. |
| 5,473,631 A | 12/1995 | Moses | 5,719,667 A | 2/1998 | Miers |
| 5,474,875 A | 12/1995 | Loerzer et al. | 5,721,781 A | 2/1998 | Deo et al. |
| 5,479,168 A | 12/1995 | Johnson et al. | 5,721,788 A | 2/1998 | Powell et al. |
| 5,489,639 A | 2/1996 | Faber et al. | 5,734,119 A | 3/1998 | France |
| 5,493,677 A | 2/1996 | Balogh et al. | 5,734,752 A | 3/1998 | Knox |
| 5,495,411 A | 2/1996 | Ananda | 5,742,845 A | 4/1998 | Wagner |
| 5,495,581 A | 2/1996 | Tsai | 5,745,308 A | 4/1998 | Spangenberg |
| 5,496,071 A | 3/1996 | Walsh | 5,761,686 A | 6/1998 | Bloomberg |
| 5,499,294 A | 3/1996 | Friedman | 5,763,868 A | 6/1998 | Kubota et al. |
| 5,509,693 A | 4/1996 | Kohls | 5,765,152 A | 6/1998 | Erickson |
| 5,514,860 A | 5/1996 | Berson | 5,768,001 A | 6/1998 | Kelley et al. |
| 5,515,081 A | 5/1996 | Vasilik | 5,768,426 A | 6/1998 | Rhoads |
| 5,516,362 A | 5/1996 | Gundjian et al. | 5,769,301 A | 6/1998 | Hebert et al. |
| 5,522,623 A * | 6/1996 | Soules et al. ................. 283/91 | 5,769,457 A | 6/1998 | Warther |
| 5,523,125 A | 6/1996 | Kennedy et al. | 5,774,168 A * | 6/1998 | Blome ...................... 347/262 |
| 5,524,933 A | 6/1996 | Kunt et al. | 5,774,452 A | 6/1998 | Wolosewicz |
| 5,525,403 A | 6/1996 | Kawabata et al. | 5,776,278 A | 7/1998 | Tuttle et al. |
| 5,529,345 A | 6/1996 | Kohls | 5,778,102 A | 7/1998 | Sandford, II et al. |
| 5,530,852 A | 6/1996 | Meske, Jr. et al. | 5,783,024 A | 7/1998 | Forkert |
| 5,534,372 A | 7/1996 | Koshizuka et al. | 5,790,703 A | 8/1998 | Wang |
| 5,548,645 A | 8/1996 | Ananda | 5,795,643 A | 8/1998 | Steininger et al. |
| 5,550,346 A | 8/1996 | Andriash et al. | 5,801,687 A | 9/1998 | Peterson |
| 5,553,143 A | 9/1996 | Ross | 5,801,857 A | 9/1998 | Heckenkamp et al. |
| 5,560,799 A | 10/1996 | Jacobsen | 5,804,803 A | 9/1998 | Cragun et al. |
| 5,576,377 A | 11/1996 | El Sayed et al. | 5,808,758 A | 9/1998 | Solmsdorf |
| 5,579,479 A | 11/1996 | Plum | 5,809,139 A | 9/1998 | Girod et al. |
| 5,579,694 A | 12/1996 | Mailloux | 5,809,317 A | 9/1998 | Kogan |
| 5,585,618 A | 12/1996 | Droz | 5,809,633 A | 9/1998 | Mundigl et al. |
| 5,594,226 A | 1/1997 | Steger | 5,815,292 A | 9/1998 | Walters |
| 5,594,809 A | 1/1997 | Kopec et al. | 5,816,619 A | 10/1998 | Schaede |
| 5,612,943 A | 3/1997 | Moses et al. | 5,818,441 A | 10/1998 | Throckmorton |
| 5,613,004 A | 3/1997 | Cooperman et al. | 5,824,447 A | 10/1998 | Tavernier et al. |
| 5,629,980 A | 5/1997 | Stefik | 5,824,715 A | 10/1998 | Hayashihara et al. ......... 522/14 |
| 5,633,119 A | 5/1997 | Burberry et al. ............ 430/292 | 5,825,892 A | 10/1998 | Braudaway et al. |
| 5,634,012 A | 5/1997 | Stefik | 5,828,325 A | 10/1998 | Wolosewicz et al. |
| 5,635,012 A | 6/1997 | Belluci et al. | 5,840,142 A | 11/1998 | Stevenson et al. |
| 5,636,276 A | 6/1997 | Brugger | 5,840,791 A | 11/1998 | Magerstedt et al. |
| 5,638,443 A | 6/1997 | Stefik | 5,841,886 A | 11/1998 | Rhoads |
| 5,639,819 A | 6/1997 | Farkas et al. | 5,841,978 A | 11/1998 | Rhoads |
| 5,640,647 A | 6/1997 | Hube | 5,844,685 A | 12/1998 | Gontin |
| 5,646,997 A | 7/1997 | Barton | 5,845,281 A | 12/1998 | Benson et al. |
| 5,646,999 A | 7/1997 | Saito | 5,848,413 A | 12/1998 | Wolff |
| 5,652,626 A | 7/1997 | Kawakami et al. | 5,848,424 A | 12/1998 | Scheinkman |
| 5,652,714 A | 7/1997 | Peterson | 5,852,673 A | 12/1998 | Young |
| 5,654,105 A | 8/1997 | Obringer et al. | 5,853,955 A | 12/1998 | Towfiq |
| 5,657,462 A | 8/1997 | Brouwer | 5,855,969 A | 1/1999 | Robertson ................... 427/555 |
| 5,658,411 A | 8/1997 | Faykish | 5,856,661 A | 1/1999 | Finkelstein et al. |
| 5,659,164 A | 8/1997 | Schmid | 5,857,038 A | 1/1999 | Owada et al. |
| 5,659,726 A | 8/1997 | Sandford, II et al. | 5,861,662 A | 1/1999 | Candelore |
| 5,663,766 A | 9/1997 | Sizer, II | 5,862,260 A | 1/1999 | Rhoads |
| 5,665,951 A | 9/1997 | Newman et al. | 5,864,622 A | 1/1999 | Marcus |
| 5,668,636 A | 9/1997 | Beach et al. | 5,866,644 A | 2/1999 | Mercx et al. ................. 524/417 |
| 5,669,955 A | 9/1997 | Hong | 5,867,199 A | 2/1999 | Knox et al. |
| 5,669,995 A * | 9/1997 | Hong .......................... 369/94 | 5,869,819 A | 2/1999 | Knowles |
| 5,671,005 A | 9/1997 | McNay et al. | 5,871,615 A | 2/1999 | Harris |
| 5,671,282 A | 9/1997 | Wolff et al. | 5,872,589 A | 2/1999 | Morales |
| 5,673,316 A | 9/1997 | Auerbach et al. | 5,872,627 A | 2/1999 | Miers |

| Patent | Date | Inventor(s) |
|---|---|---|
| 5,875,249 A | 2/1999 | Mintzer et al. |
| 5,879,502 A | 3/1999 | Gustafson |
| 5,879,784 A * | 3/1999 | Breen et al. ............ 428/195.1 |
| 5,888,624 A | 3/1999 | Haghiri et al. |
| 5,892,661 A | 4/1999 | Stafford et al. |
| 5,892,900 A | 4/1999 | Ginter et al. |
| 5,893,910 A | 4/1999 | Martineau |
| 5,895,074 A | 4/1999 | Chess et al. |
| 5,897,938 A | 4/1999 | Shinmoto et al. |
| 5,900,608 A | 5/1999 | Iida |
| 5,902,353 A | 5/1999 | Reber et al. |
| 5,903,729 A | 5/1999 | Reber et al. |
| 5,905,248 A | 5/1999 | Russell et al. |
| 5,905,251 A | 5/1999 | Knowles et al. |
| 5,912,767 A | 6/1999 | Lee |
| 5,913,210 A | 6/1999 | Call |
| 5,915,027 A | 6/1999 | Cox et al. |
| 5,918,213 A | 6/1999 | Bernard et al. |
| 5,918,214 A | 6/1999 | Perkowski |
| 5,919,853 A | 7/1999 | Condit et al. ............ 524/413 |
| 5,920,861 A | 7/1999 | Hall |
| 5,920,878 A | 7/1999 | DeMont |
| 5,925,500 A | 7/1999 | Yang et al. ............ 430/300 |
| 5,926,822 A | 7/1999 | Garman |
| 5,928,788 A | 7/1999 | Riedl |
| 5,928,989 A * | 7/1999 | Ohnishi et al. ............ 503/227 |
| 5,930,377 A | 7/1999 | Powell et al. |
| 5,930,767 A | 7/1999 | Reber et al. |
| 5,932,863 A | 8/1999 | Rathus |
| 5,933,829 A | 8/1999 | Durst et al. |
| 5,935,694 A | 8/1999 | Olmstead et al. |
| 5,936,986 A | 8/1999 | Cantatore et al. |
| 5,938,726 A | 8/1999 | Reber et al. |
| 5,938,727 A | 8/1999 | Ikeda |
| 5,939,695 A | 8/1999 | Nelson |
| 5,939,699 A | 8/1999 | Perttunen et al. |
| 5,940,595 A | 8/1999 | Reber et al. |
| 5,944,356 A | 8/1999 | Bergmann et al. |
| 5,944,881 A | 8/1999 | Mehta et al. |
| 5,949,055 A | 9/1999 | Fleet et al. |
| 5,950,173 A | 9/1999 | Perkowski |
| 5,953,710 A | 9/1999 | Fleming |
| 5,955,021 A | 9/1999 | Tiffany, III |
| 5,955,024 A | 9/1999 | Tiffany, III |
| 5,955,961 A | 9/1999 | Wallerstein |
| 5,958,528 A | 9/1999 | Berndecker ............ 428/29 |
| 5,962,840 A | 10/1999 | Haghiri-Tehrani et al. |
| 5,963,916 A | 10/1999 | Kaplan |
| 5,965,242 A | 10/1999 | Patton et al. |
| 5,969,324 A | 10/1999 | Rebert et al. |
| 5,971,277 A | 10/1999 | Cragun et al. |
| 5,973,842 A | 10/1999 | Spangenberg |
| 5,974,141 A | 10/1999 | Saito |
| 5,974,548 A | 10/1999 | Adams |
| 5,975,583 A | 11/1999 | Cobben et al. |
| 5,977,514 A | 11/1999 | Feng et al. ............ 219/121.69 |
| 5,978,773 A | 11/1999 | Hudetz et al. |
| 5,979,757 A | 11/1999 | Tracy et al. |
| 5,983,218 A | 11/1999 | Syeda-Mahmoo |
| 5,985,078 A | 11/1999 | Suess et al. ............ 156/239 |
| 5,988,820 A | 11/1999 | Huang et al. |
| 5,991,876 A | 11/1999 | Johnson |
| 6,000,607 A | 12/1999 | Ohki et al. |
| 6,002,383 A * | 12/1999 | Shimada ............ 235/380 |
| 6,003,581 A | 12/1999 | Aihara |
| 6,007,660 A | 12/1999 | Forkert |
| 6,007,929 A | 12/1999 | Robertson et al. ............ 428/913 |
| 6,012,641 A | 1/2000 | Watada |
| 6,016,225 A | 1/2000 | Anderson |
| 6,017,972 A | 1/2000 | Harris et al. |
| 6,022,905 A | 2/2000 | Harris et al. ............ 522/2 |
| 6,024,287 A | 2/2000 | Takai et al. |
| 6,028,134 A | 2/2000 | Zhang et al. |
| 6,036,099 A | 3/2000 | Leighton |
| 6,036,807 A | 3/2000 | Brongers |
| 6,037,102 A | 3/2000 | Loerzer et al. |
| 6,047,888 A | 4/2000 | Dethloff |
| 6,049,055 A | 4/2000 | Fannash et al. |
| 6,049,463 A | 4/2000 | O'Malley et al. |
| 6,051,297 A | 4/2000 | Maier et al. |
| 6,052,486 A | 4/2000 | Knowlton et al. |
| 6,054,170 A | 4/2000 | Chess et al. |
| 6,064,414 A | 5/2000 | Kobayashi et al. |
| 6,064,764 A | 5/2000 | Bhaskaran et al. |
| 6,066,437 A | 5/2000 | Kosslinger ............ 430/297 |
| 6,066,594 A * | 5/2000 | Gunn et al. ............ 503/227 |
| 6,071,612 A | 6/2000 | Roderiguez et al. |
| 6,073,854 A | 6/2000 | Bravenec et al. |
| 6,075,223 A | 6/2000 | Harrison |
| 6,086,971 A | 7/2000 | Haas et al. |
| 6,095,566 A | 8/2000 | Yamamoto et al. |
| 6,100,804 A | 8/2000 | Brady et al. |
| 6,101,602 A | 8/2000 | Fridrich |
| 6,110,864 A | 8/2000 | Lu |
| 6,111,506 A | 8/2000 | Yap et al. |
| 6,120,882 A | 9/2000 | Faykish et al. |
| 6,122,403 A | 9/2000 | Rhoads |
| 6,127,475 A | 10/2000 | Vollenberg et al. |
| 6,131,161 A | 10/2000 | Linnartz |
| 6,143,852 A | 11/2000 | Harrison et al. |
| 6,146,032 A | 11/2000 | Dunham |
| 6,146,741 A | 11/2000 | Ogawa et al. |
| 6,155,605 A | 12/2000 | Bratchley et al. |
| 6,157,330 A | 12/2000 | Bruekers et al. |
| 6,159,327 A | 12/2000 | Forkert |
| 6,160,526 A | 12/2000 | Hirai et al. |
| 6,163,842 A | 12/2000 | Barton |
| 6,165,696 A | 12/2000 | Fischer ............ 430/320 |
| 6,166,911 A | 12/2000 | Usami et al. |
| 6,174,400 B1 | 1/2001 | Krutak et al. |
| 6,179,338 B1 | 1/2001 | Bergmann et al. |
| 6,326,128 B1 | 1/2001 | Telser |
| 6,183,018 B1 | 2/2001 | Braun et al. |
| 6,185,042 B1 | 2/2001 | Lomb et al. |
| 6,186,404 B1 * | 2/2001 | Ehrhart et al. ............ 235/493 |
| 6,199,144 B1 | 3/2001 | Arora et al. |
| 6,202,932 B1 | 3/2001 | Rapeli |
| 6,205,249 B1 | 3/2001 | Moskowitz |
| 6,206,291 B1 | 3/2001 | Droz |
| 6,207,244 B1 | 3/2001 | Ramlow et al. |
| 6,207,344 B1 | 3/2001 | Ramlow et al. |
| 6,209,923 B1 * | 4/2001 | Thaxton et al. ............ 283/72 |
| 6,214,916 B1 | 4/2001 | Mercx et al. |
| 6,214,917 B1 | 4/2001 | Linzmeier et al. |
| 6,221,552 B1 | 4/2001 | Street et al. |
| 6,234,537 B1 | 5/2001 | Gutmann et al. |
| 6,238,840 B1 | 5/2001 | Hirayama et al. |
| 6,238,847 B1 | 5/2001 | Axtell, III et al. |
| 6,242,249 B1 | 6/2001 | Burnham et al. |
| 6,243,480 B1 | 6/2001 | Zhao et al. |
| 6,244,514 B1 | 6/2001 | Otto |
| 6,247,644 B1 | 6/2001 | Horne et al. |
| 6,250,554 B1 | 6/2001 | Leo et al. |
| 6,256,736 B1 | 7/2001 | Coppersmith et al. |
| 6,257,486 B1 | 7/2001 | Teicher et al. |
| 6,259,506 B1 * | 7/2001 | Lawandy ............ 349/193 |
| 6,277,232 B1 | 8/2001 | Wang et al. |
| 6,283,188 B1 | 9/2001 | Maynard et al. |
| 6,284,337 B1 | 9/2001 | Lorimor et al. |
| 6,286,036 B1 | 9/2001 | Rhoads |
| 6,286,761 B1 | 9/2001 | Wen |
| 6,289,108 B1 | 9/2001 | Rhoads |
| 6,291,551 B1 | 9/2001 | Kniess et al. |
| 6,292,092 B1 | 9/2001 | Chow et al. |
| 6,293,470 B1 | 9/2001 | Asplund |
| 6,301,363 B1 | 10/2001 | Mowry, Jr. |

| | | | | | | |
|---|---|---|---|---|---|---|
| 6,302,444 | B1 | 10/2001 | Cobben | 2003/0178487 A1 | 9/2003 | Rogers |
| 6,311,214 | B1 | 10/2001 | Rhoads | 2003/0178495 A1 | 9/2003 | Jones et al. |
| 6,313,436 | B1 | 11/2001 | Harrison | 2003/0211296 A1* | 11/2003 | Jones et al. ............... 428/195.1 |
| 6,321,981 | B1 | 11/2001 | Ray et al. | 2003/0234286 A1 | 12/2003 | Labrec et al. |
| 6,324,091 | B1 | 11/2001 | Gryko et al. | 2004/0020992 A1 | 2/2004 | Lasch et al. |
| 6,324,573 | B1 | 11/2001 | Rhoads | 2004/0076310 A1 | 4/2004 | Hersch et al. |
| 6,343,138 | B1 | 1/2002 | Rhoads | 2004/0198858 A1 | 10/2004 | Labrec |
| 6,357,664 | B1 | 3/2002 | Zercher | 2004/0245346 A1 | 12/2004 | Haddock |
| 6,368,684 | B1 | 4/2002 | Onishi et al. | 2005/0072849 A1 | 4/2005 | Jones |
| 6,372,394 | B1 | 4/2002 | Zientek | 2005/0003297 A1 | 5/2005 | Labrec |
| 6,380,131 | B2 | 4/2002 | Griebel et al. | 2005/0095408 A1 | 5/2005 | LaBrec et al. |
| 6,390,375 | B2 | 5/2002 | Kayanakis | | | |
| 6,400,386 | B1 | 6/2002 | No et al. | FOREIGN PATENT DOCUMENTS | | |
| 6,404,643 | B1 | 6/2002 | Chung | CA | 2359937 | 7/2000 |
| 6,412,701 | B1 | 7/2002 | Kohama et al. | DE | 2223290 | 4/1973 |
| 6,413,687 | B1 | 7/2002 | Hattori et al. | DE | 3806411 | 9/1989 |
| 6,418,154 | B1 | 7/2002 | Kneip et al. | DE | 69906553 | 2/2004 |
| 6,421,013 | B1 | 7/2002 | Chung | EP | 058 482 | 8/1982 |
| 6,424,029 | B1 | 7/2002 | Giesler | EP | 190997 A | 8/1986 |
| 6,444,068 | B1 | 9/2002 | Koops et al. | EP | 0279104 | 8/1988 |
| 6,446,865 | B1 | 9/2002 | Holt et al. | EP | 0356980 | 3/1990 |
| 6,473,165 | B1 | 10/2002 | Coombs et al. | EP | 0356981 | 3/1990 |
| 6,474,695 | B1 | 11/2002 | Schneider et al. | EP | 0356982 | 3/1990 |
| 6,475,588 | B1 | 11/2002 | Schottland et al. | EP | 0362640 | 4/1990 |
| 6,478,228 | B1 | 11/2002 | Ikefuji et al. | EP | 0366923 | 5/1990 |
| 6,478,229 | B1 | 11/2002 | Epstein | EP | 372 601 | 6/1990 |
| 6,482,495 | B1 | 11/2002 | Kohama et al. | EP | 0373572 | 6/1990 |
| 6,485,319 | B2 | 11/2002 | Bricaud et al. | EP | 0374835 | 6/1990 |
| 6,503,310 | B1 | 1/2003 | Sullivan | EP | 411 232 | 2/1991 |
| 6,525,672 | B2 | 2/2003 | Chainer et al. | EP | 441 702 | 8/1991 |
| 6,527,173 | B1 | 3/2003 | Narusawa et al. | EP | 0446834 | 9/1991 |
| 6,536,665 | B1 | 3/2003 | Ray et al. | EP | 0446846 | 9/1991 |
| 6,555,213 | B1 | 4/2003 | Koneripalli et al. | EP | 493 091 | 7/1992 |
| 6,581,839 | B1 | 6/2003 | Lasch et al. | EP | 0539001 | 4/1993 |
| 6,614,914 | B1 | 9/2003 | Rhoads et al. | EP | 581 317 | 2/1994 |
| 6,616,993 | B2* | 9/2003 | Usuki et al. ............... 428/32.79 | EP | 629 972 | 12/1994 |
| 6,638,635 | B2 | 10/2003 | Hattori et al. | EP | 0637514 | 2/1995 |
| 6,712,397 | B1 | 3/2004 | Mayer et al. | EP | 0697433 | 2/1996 |
| 6,715,797 | B2 | 4/2004 | Curiel | EP | 705 025 | 4/1996 |
| 6,752,432 | B1* | 6/2004 | Richardson ................. 283/91 | EP | 0734870 | 10/1996 |
| 6,764,014 | B2 | 7/2004 | Lasch et al. | EP | 0739748 | 10/1996 |
| 6,769,713 | B2 | 8/2004 | Warther et al. | EP | 642 060 | 4/1999 |
| 6,769,718 | B1 | 8/2004 | Warther et al. | EP | 0982149 | 3/2000 |
| 6,782,115 | B2 | 8/2004 | Decker et al. | EP | 0991014 | 4/2000 |
| 6,794,115 | B2 | 9/2004 | Telser et al. | EP | 1013463 | 6/2000 |
| 6,803,114 | B1 | 10/2004 | Vere et al. | EP | 1017016 | 7/2000 |
| 6,817,530 | B2 | 11/2004 | Labrec et al. | EP | 1035503 | 9/2000 |
| 6,825,265 | B2 | 11/2004 | Daga et al. | EP | 1046515 | 10/2000 |
| 6,827,277 | B2* | 12/2004 | Bloomberg et al. ......... 235/491 | EP | 1113935 | 2/2003 |
| 6,827,283 | B2* | 12/2004 | Kappe et al. ................ 235/494 | GB | 1088318 | 10/1967 |
| 6,843,422 | B2 | 1/2005 | Jones et al. | GB | 11213193 | 11/1970 |
| 6,900,767 | B2 | 5/2005 | Hattori | GB | 1472581 | 5/1977 |
| 6,923,378 | B2 | 8/2005 | Jones et al. | GB | 2063018 | 5/1981 |
| 6,954,293 | B2 | 10/2005 | Heckenkamp et al. | GB | 2067871 | 7/1981 |
| 6,994,262 | B1 | 2/2006 | Warther | GB | 2132136 | 7/1984 |
| 7,199,456 | B2 | 4/2007 | Krappe et al. | GB | 2196167 | 4/1988 |
| 7,207,494 | B2 | 4/2007 | Theodossiou et al. | GB | 2204984 | 11/1988 |
| 2001/0002035 | A1 | 5/2001 | Kayanakis | GB | 2227570 | 8/1990 |
| 2002/0018430 | A1 | 2/2002 | Heckenkamp et al. | GB | 2240194 | 7/1991 |
| 2002/0021001 | A1 | 2/2002 | Stratford et al. | GB | 2240948 | 8/1991 |
| 2002/0023218 | A1 | 2/2002 | Lawandy et al. | GB | 2325765 | 12/1998 |
| 2002/0027359 | A1 | 3/2002 | Cobben et al. | JP | 63146909 | 9/1988 |
| 2002/0070280 | A1 | 6/2002 | Ikefuji et al. | JP | 3-185585 | 8/1991 |
| 2002/0077380 | A1 | 6/2002 | Wessels et al. | JP | 4-248771 | 9/1992 |
| 2002/0111409 | A1 | 8/2002 | Talibuddin | JP | 5-242217 | 9/1993 |
| 2002/0116330 | A1 | 8/2002 | Hed et al. | JP | 6234289 | 8/1994 |
| 2002/0146549 | A1 | 10/2002 | Kranenburg-Van Dijk et al. | JP | 7115474 | 5/1995 |
| 2002/0170966 | A1* | 11/2002 | Hannigan et al. ...... 235/462.01 | JP | 10171758 | 6/1998 |
| 2002/0187215 | A1 | 12/2002 | Trapani et al. | JP | 10177613 | 6/1998 |
| 2003/0031340 | A1 | 2/2003 | Alattar et al. | JP | 11259620 | 9/1999 |
| 2003/0038174 | A1* | 2/2003 | Jones ........................ 235/380 | JP | 11301121 | 11/1999 |
| 2003/0117262 | A1 | 6/2003 | Anderegg et al. | JP | 11321166 | 11/1999 |
| 2003/0141358 | A1 | 7/2003 | Hudson et al. | | | |

| | | |
|---|---|---|
| WO | WO 82/004149 | 11/1982 |
| WO | WO 89/08915 | 9/1989 |
| WO | WO 91/16722 | 10/1991 |
| WO | WO 94/03333 | 2/1994 |
| WO | WO 94/27228 | 11/1994 |
| WO | WO 95/09984 | 4/1995 |
| WO | WO 95/10835 | 4/1995 |
| WO | WO 95/14289 | 5/1995 |
| WO | WO 95/20291 | 7/1995 |
| WO | WO 96/27259 | 9/1996 |
| WO | WO 96/36163 | 11/1996 |
| WO | WO 97/001446 | 1/1997 |
| WO | WO 97/32733 | 9/1997 |
| WO | WO 98/14887 | 4/1998 |
| WO | WO 98/19869 | 5/1998 |
| WO | WO 98/20642 | 5/1998 |
| WO | WO 98/24050 | 7/1998 |
| WO | WO 98/30224 | 7/1998 |
| WO | WO 98/40823 | 9/1998 |
| WO | WO 98/49813 | 11/1998 |
| WO | WO 99/24934 | 5/1999 |
| WO | WO 99/34277 | 7/1999 |
| WO | WO 00/0043214 | 7/2000 |
| WO | WO 00/0043215 | 7/2000 |
| WO | WO 00/0043216 | 7/2000 |
| WO | WO 00/0045344 | 8/2000 |
| WO | WO 01/56805 | 8/2000 |
| WO | WO 00/78554 | 12/2000 |
| WO | WO 01/00719 | 1/2001 |
| WO | WO 01/29764 A1 | 4/2001 |
| WO | WO 01/45559 | 6/2001 |
| WO | WO 02/26507 A1 | 4/2002 |
| WO | WO 02/27647 A1 | 4/2002 |
| WO | WO 02/42371 | 5/2002 |
| WO | WO 02/45969 | 6/2002 |
| WO | WO 2002/053499 | 7/2002 |
| WO | WO 02/078965 A1 | 10/2002 |
| WO | WO 02/78965 A1 | 10/2002 |
| WO | WO 03/005291 | 1/2003 |
| WO | WO03/056507 | 7/2003 |
| WO | WO 2003/055684 | 7/2003 |

OTHER PUBLICATIONS

PCT—International Search Report for International Application No. PCT/USO2/41644, mailed on May 30, 2003.

PCT—Notification of Transmittal of the International Search Report or the Declaration, for International Application No. PCT/USO2/41681, mailed on Jun. 5, 2003.

PCT—International Search Report for International Application No. PCT/USO2/41681, mailed on Jun. 5, 2003.

Printed copy of a PolyOne company web page for Fast Mark colorants, 2 printed pages, printed on Dec. 15, 2003 and accessed from: http://www.polyone.com/bizunit/bizunit_info.asp?ID1={4D07B4ED-C098-43E4-B802-21413AFA74C}&ID2={8C29FDCA-7C9E-433E-897A-DB6354A01CAA}&ID3={00000000-0000-0000-0000-000000000000}&ID4= {FE3434DA-7FA0-4FFF-99AF-CDD99EC16AE1}&bizUnit=NA-P-CM&line=&sub=none.

Supplemental European Search Report dated Jul. 20, 2006, from EP Application No. 02805980 (Corresponding to PCT/US02/41681; Published as WO03/056507).

Examiner's Report dated May 2, 2006, from CA Application No. 2,470,600 (Corresponding to PCT/US02/41681; Published as WO03/056507).

Aug. 16, 2007 communication from the Canadian Intellectual Property Office in Application No. 2,470,600, and a Feb. 15, 2008 Amendment in response thereto.

Oct. 18, 2007 Communication from the European Patent Office in Application No. EP 02 805 980.6.

Amended claims from WO/056507, corresponding to those in EP 02 805 980.6.

"About Card Printing How it Works", http://www.racoindustries.com/aboutcardp5.htm. pp. 1-3 (Dec. 22, 2002).

"Access Control and Copyright Protection for Images WorkPackage 8: Watermarking " Jun. 30 1995, 46 pages.

"Access Control and Copyright Protection for Images, WorkPackage 3: Evaluation of Existing Systems," Apr. 19, 1995, 68 pages.

"Access Control and Copyright Protection for Images, WorkPackage 1: Access Control and Copyright Protection for Images Need Evaluation," Jun. 1995, 21 pages.

"Copyright Protection for Digital Images, Digital Fingerprinting from FBI, "Highwater FBI brochure 1995, 4 pages.

"Cyphertech Systems: Introduces Digital Encoding Device to Prevent TV Piracy," Hollywood Reporter, Oct 20, 1993, p. 23.

"Foiling Card Forges With Magnetic Noise," Wall Street Journal, Feb. 8, 1994.

"High Water FBI Limited Presentation Image Copyright Protection Software," FBI Ltd. brochure, Jul., 1995, 17 pages.

"Lenticular Prints", http://www.shortcourses.com/how/lenticular/lentcular.htm, pp. 1-6 (Dec. 16, 2002).

"NAB—Cyphertech Starts Anti-Piracy Broadcast Tests," Newsbytes, NEW03230023, Mar. 23, 1994.

"Polaroid's Polaprime UV Invisible Ink System Winks at Hollywood As Godzilla's Eye in Promo Display", http://www.polaroid.com/polinfo/press_releases/august98/080598a.html., pp. 1-2 (Nov. 26, 2002).

"Secure ID Center: Design a Secure Id card Key technologies for a secure ID", http://www.datacard.com/secureid/secureid_card_technologies features.shtm., pp. 1-5 (Dec. 12, 2002).

"Technologies Overview", http://www.nfive.com/Articles/2.htm, pp. 1-2 (Dec. 22, 2002).

"The Copyright Can of Worms Opened Up by the New Electronic Media," Computergram Internations, pCGN07170006, Jul. 17, 1995 and the Copyright Can of Worms Opened Up by the New Electronic Media-2, Computergram Internations, pCGN07210008, Jul. 21, 1995, 3 pages.

"Welcome to Orasee Corporation", http://www.orasee.com/one/main.php3, pp. 1-2, (Dec. 13, 2002).

"What are 'Dye Sublimation Thermal Printers'? (Technology)", http://www.nfive.com/Articles/2.htm., pp. 1-2 (Dec. 22, 2002).

Arachelian, "White Noise Storm," Apr. 11, 1994, Internet reference, 13 pages.

Arthur, "Digital Fingerprints Protect Artwork," New Scientist, Nov. 12, 1994, p. 24.

Aug. 16, 2007 communication from the Canadian Intellectual Property Office in Application No. 2,470,600, and a Feb. 15, 2008 Amendment in response thereto.

Bender et al., "Techniques for Data Hiding, "Massachusetts Institute of Technology, Media Laboratory, Jan, 1995, 10 pages.

Boland et al, "Watermarking Digital Images for Copyright Protection "Fifth International Conference on Image Processing and its Applications, Conference Date Jul. 4-6, 1995, Conf. Publ. No. 410, pp. 326-330.

Boneh, "Collusion-Secure Fingerprinting for Digital Data," Department of Computer Science, Princeton University, 1995, 31 pages.

Bovik, "Handbook of Image and Video Processing," Academic Press, 2000, pp. 133-136, 154, 155.

Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.

Brown, "S-Tools for Windows, Version 1.00, COPYRGT. 1994 Andy Brown, What is Steganography," Internet reference, Mar. 6, 1994, 6 pages.

Bruckstein, A.M.; Richardson, T.J., A holographic transform domain image watermarking method, Circuits, Systems, and Signal Prcessing vol. 17, No. 3 p. 361-89, 1998. This paper includes an appendix containing an internal memo of Bell labs, which according to the authors of the paper, was dated Sep. 1994.

Canadian Patent application 2,469,938, claims as filed, with effective filed of Dec. 20, 2002, 10 pages.

Canadian Patent application 2,469,938, Office Action dated Jul. 24, 2006, 2 pages.

Caronni, "Assuring Ownership Rights for Digital Images," Published in the Proceedings of 'Reliable It Systems,' vis '95 HH. Bruggemann and W. Gerhardt-Hackl (Ed.), Vieweg Publishing Company, Germany, 1995, Jun. 14, 1994, 10 pages.

Castro, et al., "Registration of Translated and Rotated Images Using Finite Fourier Transforms," IEEE Transactions on Pattern Analysis and Machine Intelligence, vol. PAMI-9, No. 5, Sep. 1987, pp. 700-703.

Choudhury, et al., "Copyright Protection for Electronic Publishing over Computer Networks," IEEE Network Magazine, Jun. 1994, 18 pages.

Clariant Masterbatches Division Price Quotation #474938, Nov. 30, 2000, 2 pages.

Clariant Masterbatches, pricing, #762998, 2 pages.

Clarke, "Invisible Code Tags Electronic Images," Electronic Engineering Times, Jun. 12, 1995, No. 852, p. 42.

Datacard DCL30, "The Most Secure Card Personalization System for ID Programs," 2002, 3 pages.

Dautzenberg, "Watermarking Images," Department of Microelectronics and Electrical Engineering, Trinity College Dublin, 47 pages, Oct. 1994.

effekte, "Plastics on the Rise", Mar. 2001, 12 pages.

EM Industries Inc., Lazer Flair LS Series Pigments, Dec. 11, 2002, 3 pages.

EP 01992398.6 notice of grant, dated Nov. 28, 2005.

EP 01992398.6 response to first examination report, dated Jul. 18,2005.

Final Rejection, U.S. Appl. No. 10/836,639, Bi et al., filed Apr. 29, 2004, mailed Apr. 1, 2008.

Fitzgerald, "Invisible Digital Copyright ID," Editor & Publisher, Jun. 25, 1994, p. 62.

Friedman, "The Trustworthy Digital Camera: Restoring Credibility to the Photographic Image," IEEE Transaction on Consumer Electronics, vol. 39, No. 4, Nov., 1993, pp. 905-910.

Graff, "Laser Marking Makes Bigger Imprint in Plastics", Aug. 11, 2004 7 pages.

Hecht, "Embedded Data Glyph Technology for Hardcopy Digital Documents," SPIE vol. 2171, Feb. 1994, pp. 341-352.

Hill, "Cure of Thermoset Industrial Coatings", Proc. 2d Pacific Coatings forum, Nov. 1-3, 1997, 6 pages.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM-23, No. 3, Mar. 1975, pp. 318-331.

JPEG Group's JPEG Software (release 4), FTP.CSUA.Berekeley. Edu/Pub/Cypherpunks/Applications/JSTEG/JPEG.Announcement. GZ, Jun. 7, 1993, 2 pages.

Kassam, Signal Detection in Non-Gaussian Noise, Dowden & Culver, 1988, pp. 1-96.

Kawaguchi, et al., "Principle and Applications of BPCS-Streganography," Proc. SPIE vol. 3258: Multimedia Systems and Applications, Nov. 2-4, 1998, pp. 464-473.

Koch, et al., "Copyright Protection for Multimedia Data," Fraunhofer Institute for Computer Graphics, Dec. 16, 1994, 15 pages.

Koch, et al., "Towards Robust and Hidden Image Copyright Labeling," Proc. of 1995 IEEE Workshop on Nonlinear Signal and Image Processing, Jun. 20-22, 1995 4 pages.

Komatsu et al., "Authentication System Using Concealed Image in Telematics," Memoirs of the School of Science & Engineering, Waseda Univ., No. 52, 1988, pp. 45-60.

Komatsu, et al., "A Proposal on Digital Watermarking in Document Image Communication and Its Application to Realizing a Signature," Electronics and Communications in Japan, Part I, vol., 73, No. 5, 1990, pp. 22-23.

Kurak et al., "A Cautionary Note on Image Downgrading," 1992 IEEE, pp. 153-159.

Lhotka et al., "Lenticular Inkjet Printmaking", http://www.dvpratt. com/evesmind/lentOver.htm, pp. 1-2 (Dec. 16, 2002).

Luc, "Analysis of Spread Spectrum System Parameters for Design of Hidden Transmission," Radioengineering, vol. 4, No. 2, Jun. 1995, pp. 26-29.

Machado, "Announcing Stego 1.0a2, the First Steganography Tod for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944-957.

Matsui et al., "Video-Steganography: How to Secretly Embed a Signature in a Picture," IMA Intellectual Property Project Proceedings, Jan. 1995, vol, 1, Issue 1, pp. 187-205.

Matthews, "When Seeing is Not Believing," New Scientist, Oct. 16, 1993, pp. 13-15.

Mintzer et al., "Safeguarding Digital library Contents and Users" Digital watermarking, D-Lib Magazine, Dec. 1997: ISSN 1082-9873.

Moller, et al., "Rechnergestutzte Steganogradne: Wie sie Funktioniert und warum folglich jede ReglementCrung von Verschlusselung unsinnig ist," DuD, Datenschutz und Datensicherung, Jun. 18 (1994) 318-326.

Moran, R., "3-D Imagery", http://www.flexography.org/flexo/article.cfm?1D=45, pp. 1-3 (Dec. 16, 2002).

Nakamura et al., "A Unified Coding Method of Dithered Image and Text Data Using Micropatterns," Electronics and Communications in Japan, Part 1, vol. 72, Nov. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Oct. 18, 2007 Communication from the European Patent Office in Application No. EP 02 805 980.6.

Office Action dated Feb, 1, 2007, from Application No. 10/942,321, 10 pages.

Office Action dated May 13, 2008, from U.S. Appl. No. 10/677,092, 5 pages.

Office Action dated Jun, 20, 2007, from U.S. Appl. No. 10/677,092, 6 pages.

PCT - International Search Report for International Application No. PCT/US02/41680, mailed on Jun. 5, 2003.

PCT - International Search Report for International Application No. PCT/US02/40843, mailed on May 15, 2003.

PCT - International Search Report for the International Application No. PCT/US02/41320, mailed on Jul. 28, 2003.

PCT - Notification of Transmittal of the International Search Report or the Declaration, for International Application No. PCT/US02/40843, mailed on May 15, 2003.

PCT - Notification of Transmittal of the International Search Report or the Declaration, for International Application No. PCT/US02/41680, mailed on Jun. 5, 2003.

PCT - Notification of Transmittal of the International Search Report or the Declaration, for the International Application No. PCT/US02/41320, mailed on Jul. 28, 2003.

Pennebaker et al., JPEG Still Image Data Compression Standard, Chapter 3, "Aspects of the Human Visual System," pp. 23-27, 1993 Van Nostrand Reinhold, New York.

Pitas et al., "Applying Signatures on Digital Images," IEEE Workshop on Nonlinear and Signal Processing, Neos Marmaras, Greece, pp. 460-463, Jun., 1995.

Plastics Technology, "Laser Marking Has a Bright Future in Plastics", http://www. plasticstechnoloay.com/articles/200108fal.html, Aug. 2001, 5 pages.

Port, "halting Highway Robbery on the Internet," Business Week, Oct. 17, 1994, p. 212.

Rindfrey, "Towards an Equitable System for Access Control and Copyright Protection in Broadcast Image Services: The Equicrypt Approach," Intellectual Property Rights and New Technologies, Proc. of theConference, R. Oldenbourg Verlag Wien Munchen 1995, 12 pages.

Roberts, "Picture Coding Using Pseudorandom Noise," IRE Trans. on Information Theory, vol. 8, No. 2, Feb. 1962, pp. 145-154.

Sandford II, et al., "The Data Embedding Method," SPIE vol. 2615, Oct. 23, 1995, pp. 226-259.

Santroprene, "Add Value to Your TPEs with Special Effects", not dated, 12 pages.

Sapwater et al., "Electronic Copyright Protection," Photo>Electronic Imaging, vol. 37, No. 6, 1994, pp. 16-21.

Schneier, "Digital Signatures, Cryptographic Algorithms Can Create Nonforeable Signatures for Electronic Documents, Making Them Valid Legal Instruments" BYTE, No. 1993, pp. 309-312.

Schreiber et al., "A Compatible High-Definition Television System Using he Noise-Margin Method of Hiding Enhancement Information, "SMPTE Journal, Dec. 1989, pp. 873-879.

shaggy@phantom.com, "Hide and Seek v. 4.0," Internet reference, Apr. 10, 1994, 3 pages.

Sheng et al., "Experiments on Pattern Recognition Using Invariant Fourier-Mellin Descriptors," Journal of Optical Society of America, vol. 3, No. 6, Jun., 1986, pp. 771-776.

Short, "Steps Toward Unmasking Secure Communications," International Journal of Bifurcaton and Chaos, vol. 4, 1994, pp. 959-977.

Simmons, "Subliminal Channels; Past and Present," ETT, vol. 5 No. 4, Jul.-Aug. 1994, pp. 45-59.

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979.

Szepanski, "Additive Binary Data Transmission for Video Signals," Papers Presented at Conf. of Comm. Engineering Soc. Sep. 30 - Oct. 3, 1980, Technical Reports vol. 74, 342-352.

Tanaka et al., "A Visual Retrieval System with Private Information for Image Database," Proceeding International Conference on DSP Applications and Technology, Oct. 1991, pp. 415-421.

Tanaka et al., "Embedding Secret Information into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE, Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al., "Electronic WaterMark," DICTA-93, Macquarie University, Sydney, Australia, Dec., 1993, pp. 666-673.

Toga et al., "Registration Revisited," Journal of Neuroscience Methods, 48 (1993), pp. 1-13.

U.S. Appl. No. 10/836,639, Bi et al., filed Apr. 29, 2004.

van Schyndel et al., "A Digital Watermark" IEEE International Conference on Image Processing, Nov. 13-16, 1994, pp. 86-90.

W. Rankl and W. Effing, "Smart Card Hand Book" 1997, John Wiley & Sons, pp. 35-40.

Wagner, "Fingerprinting," 1983 IEEE, pp. 18-22.

Walton, "Image Authentication for a Slippery New Age," Dr. Dobb's Journal, Apr. 1995, pp. 18-26, 82-87.

Weber et al., "Correlative Image Registration," Seminars in Nuclear Medicine, vol. XXIV, No. 4, Oct. 1994, pp. 311-323.

Wise, "The History of Copyright, Photographers' Rights Span Three Centuries," PHOTO>Electronic Imaging, vol. 37, No. 6, 1994.

WO02/052499 search report, dated Aug. 30, 2002.

WO02/052499 Written Opinion, dated Mar. 18, 2004.

* cited by examiner

PRIOR ART

SYSTEMS, COMPOSITIONS, AND METHODS FOR FULL COLOR LASER ENGRAVING OF ID DOCUMENTS

RELATED APPLICATION DATA

This application is related to the following U.S. provisional patent applications, which were filed Dec. 24, 2001:

Sensitizing Materials For Laser Engraving (Application No. 60/344,677, —Inventor: Brian LaBrec);

Full Color Laser Engraved System For Identification Card Imaging (Application No. 60/344,674, —Inventor: Robert Jones);

Reducing Cracking In Identification Documents (Application No. 60/344,710, —Inventors: Robert Jones and Lori Shah);

An Inkjet Receiver On Teslin Sheet (Application No. 60/344,685, —Inventors: Daoshen Bi. and Drank Dai);

Laser Engraving Coating System (Application No. 60/344,675, —Inventor: Brain LaBrec);

Forming Variable Information In Identification Documents By Laser Ablation (Application No. 60/344,676, —Inventor: Brian LaBrec);

Laser Etched Security Feature (Application No. 60/344,716, —Inventors: George Theodossiou and Robert Jones);

Manufacture Of Contact Smart Cards (Application No. 60/344,717, —Inventors: Thomas Regan and Robert Jones);

Manufacture Of Contact-Less Smart Cards (Application No. 60/344,719, —Inventors: Daoshen Bi, Robert Jones and John Lincoln);

Manufacture Of An All-Pet Identification Document (Application No. 60/344,673, —Inventors: Thomas Regan and Robert Jones);

Tamper Evident Coating To Combat Heat Intrusion (Application No. 60/344,709, —Inventor: Brian LaBrec);

Pressure Sensitive UV Curable Adhesive Composition (Application No. 60/344,753, —Inventor: William Rice);

Heat Activated UV Curable Adhesive Composition (Application No. 60/344,688, —Inventor: William Rice);

Security Ink With Cohesive Failure (Application No. 60/344,698, —Inventor Bentley Bloomberg);

Variable Based Identification Documents With Security Features (Application No. 60/344,686, —Inventors: Robert Jones and Daoshen Bi);

Multiple Image Feature For Identification Document (Application No. 60/344,718, —Inventor: Brian LaBrec);

Biometric Identification System (Application No. 60/344,682, —Inventor: Thomas Lopolito);

Identification Document Using Polasecure In Differing Colors (Application No. 60/344,687,—Inventors: Bentley Bloomberg and Robert Jones); and Secure Id Card With Multiple Images and Method of Making (Application No. 60/344,683, —Inventor: Brian LaBrec).

The present invention is also related to the following provisional applications:

Identification Document and Related Methods (Application No. 60/421,254, —Inventors: Geoff Rhoads, et al);

Identification Document and Related Methods (Application No. 60/418,762, —Inventors: Geoff Rhoads, et al);

Image Processing Techniques for Printing Identification Cards and Documents (Application No. 60/371,335— Inventors: Nelson T. Schneck and Charles R. Duggan);

Shadow Reduction System and Related Techniques for Digital Image Capture (Application No. 60/410,544— Inventors: Scott D. Haigh and Tuan A. Hoang);

Systems and Methods for Recognition of Individuals Using Combination of Biometric Techniques (Application No. 60/418,129, —Inventors James Howard and Francis Frazier, filed Oct. 11, 2002);

Methods of Providing Optical Variable Device for Identification Documents (Application No. 60/429,115, —Inventors Jones et al.)

Systems and Methods for Managing and Detecting Fraud in Image Databases Used with Identification Documents (Application No. 60/429,501, —Inventors James Howard and Francis Frazier, filed Nov. 26, 2002);

Identification Card Printed with Jet Inks and Systems and Methods of Making Same (application Ser. No. 10/289962, —Inventors Robert Jones, Daoshen Bi, and Dennis Mailloux, filed Nov. 6, 2002);

The present invention is also related to U.S. patent application Ser. Nos. 09/747,735 (published as US 2003-0038174 A1), filed Dec. 22, 2000, and 09/602,313 (now U.S. Pat. No. 6,752,432), filed Jun. 23, 2000, 10/094,593 (published as US 2002-0170966 A1), filed Mar. 6, 2002, U.S. Provisional Patent Application No. 60/358,321, filed Feb. 19, 2002, as well as U.S. Pat. No. 6,066,594.

Each of the above U.S. Patent documents is herein incorporated by reference.

Priority

This application claims the priority of the following U.S. Provisional Application, the contents of which are incorporated herein by reference in their entirety:

Full Color Laser Engraved System For Identification Card Imaging (Application No. 60/344,674, —Inventor: Robert Jones);

FIELD

The invention relates in general to an information-bearing laminar assembly suitable for use as an identification card, and more particularly, to forming information on information-bearing laminar assembly by laser engraving.

BACKGROUND

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an automated teller machine (ATM), debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a preprinted core 20 (also referred to as a substrate). In many applications, the core can be a light-colored, opaque material, such as, for example, white polyvinyl chloride (PVC) material that is, for example, about 25 mil thick. The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26a-c is printed on the card blank 25 using a method such as Dye Diffusion Thermal Transfer ("D2T2") printing (described further below and also in commonly assigned U.S. Pat. No. 6,066,594, which is incorporated hereto by reference in its entirety.) The information 26a-c can, for example, comprise an indicium or indicia, such as the invariant or nonvarying information common to a large number of identification documents, for example the name and logo of the organization issuing the documents. The information 26a-c may be formed by any known process capable of forming the indicium on the specific core material used.

To protect the information 26a-c that is printed, an additional layer of overlaminate 24 can be coupled to the card blank 25 and printing 26a-c using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

The above-described printing techniques are not the only methods for printing information on data carriers such as ID documents. Laser beams, for example can be used for marking, writing, bar coding, and engraving many different types of materials, including plastics. Lasers have been used, for example, to mark plastic materials to create indicia such as bar codes, date codes, part nunbers, batch codes, and company logos. It will be appreciated that laser engraving or marking generally involves a process of inscribing or engraving a document surface with identification marks, characters, text, tactile marks—including text, patterns, designs (such as decorative or security features), photographs, etc.

One way to laser mark thermoplastic materials involves irradiating a material, such as a thermoplastic, with a laser beam at a given radiation. The area irradiated by the laser absorbs the laser energy and produces heat which causes a visible discoloration in the thermoplastic. The visible discoloration serves as a "mark" or indicator; it will be appreciated that laser beams can be controlled to form patterns of "marks" that can form images, lines, numbers, letters, patterns, and the like. Depending on the type of laser and the type of material used, various types of marks (e.g., dark marks on light backgrounds, light marks on dark backgrounds, colored marks) can be produced. Some types of thermoplastics, such as polyvinylchloride (PVC), acrylonitrile butadiene styrene (ABS), and polyethylene terephthalate (PET), are capable of absorbing laser energy in their native states. Some materials which are transparent to laser energy in their native state, such as polyethylene, may require the addition of one or more additives to be responsive to laser energy.

For additional background, various laser marking and/or engraving techniques are disclosed, e.g., in U.S. Pat. Nos. 6,022,905, 5,298,922, 5,294,774, 5,215,864 and 4,732,410. Each of these patents is herein incorporated by reference. In addition, U.S. Pat. Nos. 4,816,372, 4,894,110, 5,005,872, 5,977,514, and 6,179,338 describe various implementations for using a laser to print information, and these patents are incorporated herein in their entirety.

SUMMARY

Using laser beams to write or engrave information to ID cards presents a number of advantages over conventional printing. For example, the foaming of the thermoplastic that can occur with some types of laser engraving can be adapted to provide an indicium having a tactile feel, which is a useful authenticator of a data carrier that also can be very difficult to counterfeit or alter. In addition, laser engraving generally does not require the use of ink, which can reduce the cost of consumables used to manufacture an ID card. Laser engraving can also be more durable than ink printing, and more resistant to abrasion (which can be particularly useful if a counterfeiter attempts to "rub off" an indicium on an ID card). The resolution and print quality of laser engraving often can be higher than that of conventional ink-based printing. Laser engraving also can be a more environmentally friendly manufacturing process than printing with ink, especially because solvents and other chemicals often used with ink generally are not used with laser engraving.

The present invention provides improved methods for laser engraving identification documents. An identification document can be produced to allow a full color image to be formed on (or within) an identification document by laser addressing the document with multiple lasers (e.g., three near infrared lasers).

The foregoing and other features and advantages of the present invention will be even more readily apparent from the following Detailed Description, which proceeds with reference to the accompanying drawings.

BRIEF DESCRIPTION OF THE DRAWINGS

The advantages, features, and aspects of embodiments of the invention will be more fully understood in conjunction with the following detailed description and accompanying drawings, wherein.

The drawings are not necessarily to scale, emphasis instead generally being placed upon illustrating the principles of the invention. In addition, in the figures, like numbers refer to like elements.

DETAILED DESCRIPTION OF THE INVENTION

Terminology

Figure 1:
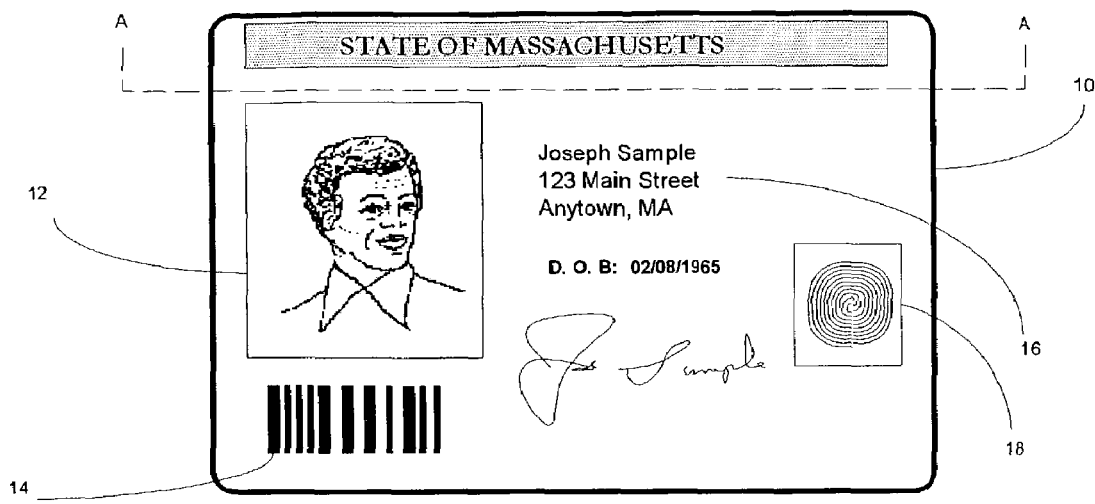
FIG. 1 is an illustrative example of a prior art identification document.
Figure 2:
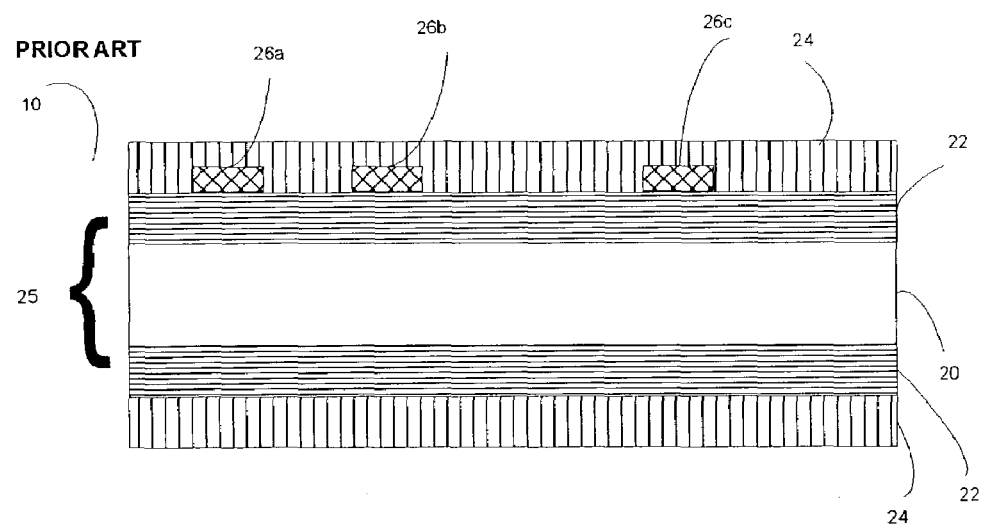
FIG. 2 is an illustrative cross section of the prior art identification document of FIG. 1, taken along the A-A line.

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light source), provide a discernable image that is usable for identification or authentication purposes.

There are a number of reasons why an image or information on an ID document might not qualify as an "identification quality" image. Images that are not "identification quality" may be too faint, blurry, coarse, small, etc., to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g. hair or eye color) of an individual.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

As used herein, the term "fixed data" refers at least to data which is identical for each ID card. Fixed data can, for example, be preprinted on an overlay patch, a laminate or an information-bearing layer of the ID card. Fixed data can also be printed on each individual ID card during the process of printing and optionally laminating the ID card. The term "variable data" refers generally to data which differs for each ID card and is associated with personal information, an image of the ID card holder or a unique reference number for security purposes assigned by the issuing agency.

As used herein, an "information-bearing layer" refers at least to the parts of an ID document where pictures, images, text, bar codes, fixed and/or variable data are printed. The information-bearing layer can include a separate receiver layer adapted to accept inks, dyes, pigments and resins from thermal print ribbons. The information-bearing layer can itself be the receiver layer. Depending on the particular design of the ID document, the information bearing layer can be the substrate or core layer, but also can be a laminate applied thereto, or to another laminate layer on the card. There can be different information bearing layers in an ID document for pre-printing and for personalization.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of potentially usable laminates include at least polyester, polycarbonate, polystyrene, cellulose ester, polyolefin, polysulfone, and polyamide. Laminates can be made using either an amorphous or biaxially oriented polymer as well. The laminate can comprise a plurality of separate laminate layers, for example a boundary layer and/or a film layer. Other possibly usable laminates include security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy. Laminates can include synthetic resin-impregnated or coated base materials composed of successive layers of material, bonded together via heat, pressure, and/or adhesive.

The material(s) from which a laminate is made may be transparent, but need not be. The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are well known to those skilled in the production of articles such as identification documents. Of course, the types and structures of the laminates described herein are provided only by way of example, those skilled in the art will appreciated that many different types of laminates are usable in accordance with the invention. Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. Patents is herein incorporated by reference.

For purposes of illustration, the following description will proceed with reference to ID document structures (such as TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways to provide information full color laser engraved information thereon. Generally, the invention has applicability for virtually any product which is to be printed and especially those products which are to be laser engraved or marked and/or which need to be uniquely identified and/or protected against fraud and/or tampering. For example, at least some embodiments of the invention are usable to form non visible indicia on articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

Forming Full Color Laser Engraved Images

In one embodiment, the invention provides a method for forming a full color laser engraved image on an ID card. As described below, a special image capable layer is prepared that is addressable by one or more near infrared (NIR) lasers. Each type of particle contained within the image capable layer is associated with a particular color (e.g., cyan, magenta, or yellow) and is responsive (i.e., can selectively absorb) a particular wavelength of laser energy to form a laser engraved pixel in that respective color. In one embodiment, the particles are selected such that the wavelengths that they respond to do not overlap significantly. By providing discrete physical particles and preventing a given particle from responding to more than one laser wavelength, it can be possible to minimize so-called "cross talk" between the cyan, magenta, and yellow centers and minimize contamination and/or chemical mixing of image formers. This helps to ensure image accuracy and quality.

Figure 3:
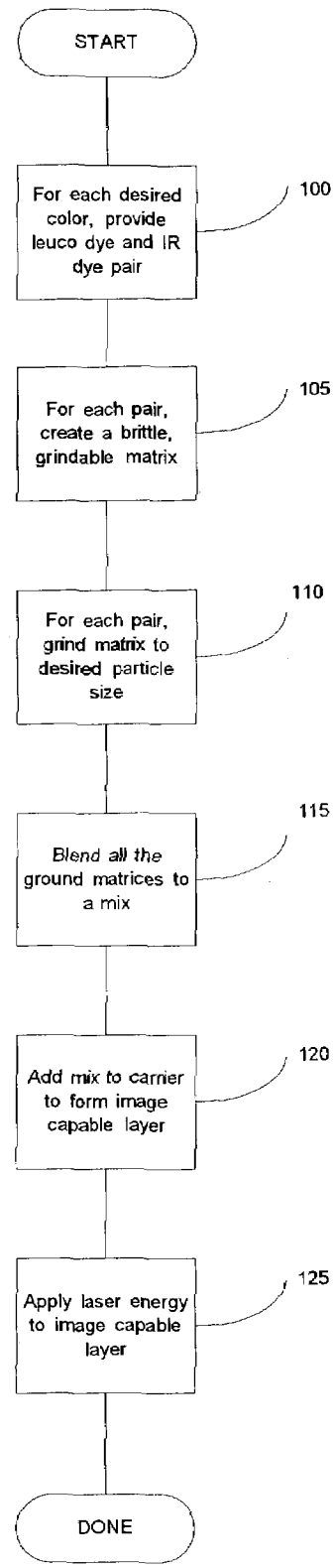
FIG. 3 is an illustrative flow chart of a method for full color laser engraving, in accordance with one embodiment of the invention.

FIG. 3 is an illustrative flow chart of a method for color laser engraving (including full color laser engraving), in accordance with one embodiment of the invention. We first select a leuco dye and IR dye pair (step 100). Our preferred embodiment employs three leuco dyes representing cyan (C), yellow (Y) and magenta (M) colors, and three infrared (IR) absorbing dyes, one for each leuco dye. In one embodiment, we use leuco dyes such as those commonly known to the "Polaroid Sunspot" and have been shown to produce photographic quality images at high resolution (e.g., >500 dpi). The leuco dyes change to a specific color (e.g., Y, M, or C) when activated with appropriate laser energy. Of course, those skilled in the art will appreciate that other types of dyes can be used in alternate embodiments, as well.

In at least one embodiment, selection of the leuco dye and/or the IR dye is accomplished so that the leuco dye and IR absorbing dye have indexes of refraction that are a substantial match to the carrier material in which the particles are to be disposed, so that the image capable layer formed as described below will be substantially transparent.

In at least one embodiment, the infrared dyes (IR) are selected so that they are transparent in the visible region (or spectrum) and absorb at selected maxima in the near IR spectrum. For example, in one advantageous embodiment, the infrared dyes absorb at maxima of 810 nanometers (nm), 850 nm, and 890 nm. These maxima are chosen such that each IR dye can be addressed with an appropriate near infrared (NIR) laser without activating the other two IR dyes, but to an extent capable of activating the leuco dyes.

The reaction of leuco dye to the colored state is a unimolecular rearrangement that is driven by heat. It is, therefore, not generally necessary to consider viscosity of the reaction medium in designing the imaging system. Preferably, it should be ensured that enough of the IR dye is in proximity to the leuco dyes so that excitation of the IR dye(s) provides enough localized temperature gradients to produce the unimolecular transformation of the color dye to the colored state.

Referring again to FIG. 3, for each pair of leuco dye and IR dye selected in step 100, a brittle, grindable compound, such as a matrix, is created (step 105). In one embodiment, this is accomplished by constructing an acrylate matrix for each leuco dye and IR dye pair. We cast each acrylate matrix (through methods well known to those skilled in the art) onto a so-called "release" web at a fixed thickness (e.g., about 10-20 microns). The acrylate matrix is then fully cured (e.g., through an appropriate curing method for the matrix, such as ultraviolet (UV) based curing), to create the brittle grindable matrix. In one embodiment, the acrylate monomers, initiators, etc. are chosen to yield a brittle matrix and a very high cure rate (e.g., substantially 100% cured).

Each fully cured acrylate/leuco dye/IR dye matrix is then removed from the reusable "release" carrier and ground (step 110) to a desired particle size. In one embodiment, the desired average particle size is roughly 10 microns thick (about 10-20u square—max). The grinding can occur in many different ways, as will be appreciated by those skilled in the art. In one embodiment, we use cryogenics to grind the fully cured acrylate/leuco dye/IR dye matrix. The resultant particles can have any shape, although the grinding tends to produce irregularly shaped particles. In this fashion, we prepare three separate acrylate matrices each with its own leuco dye/IR dye pair.

We then blend the three matrices (step 115) to obtain a mix that is added to a carrier to form an image capable layer (120)—that is, a layer that is capable of having an image formed (i.e., laser marked or laser engraved) thereon by the application of appropriate laser energy. In one embodiment, the mix is cast into a thickness of roughly 1-5 mils (e.g., 25-125u). This thickness of mix can result in an image capable layer that is capable of generating a full color image, with appropriate color balance, when laser energy is applied (step 125).

Figure 4:
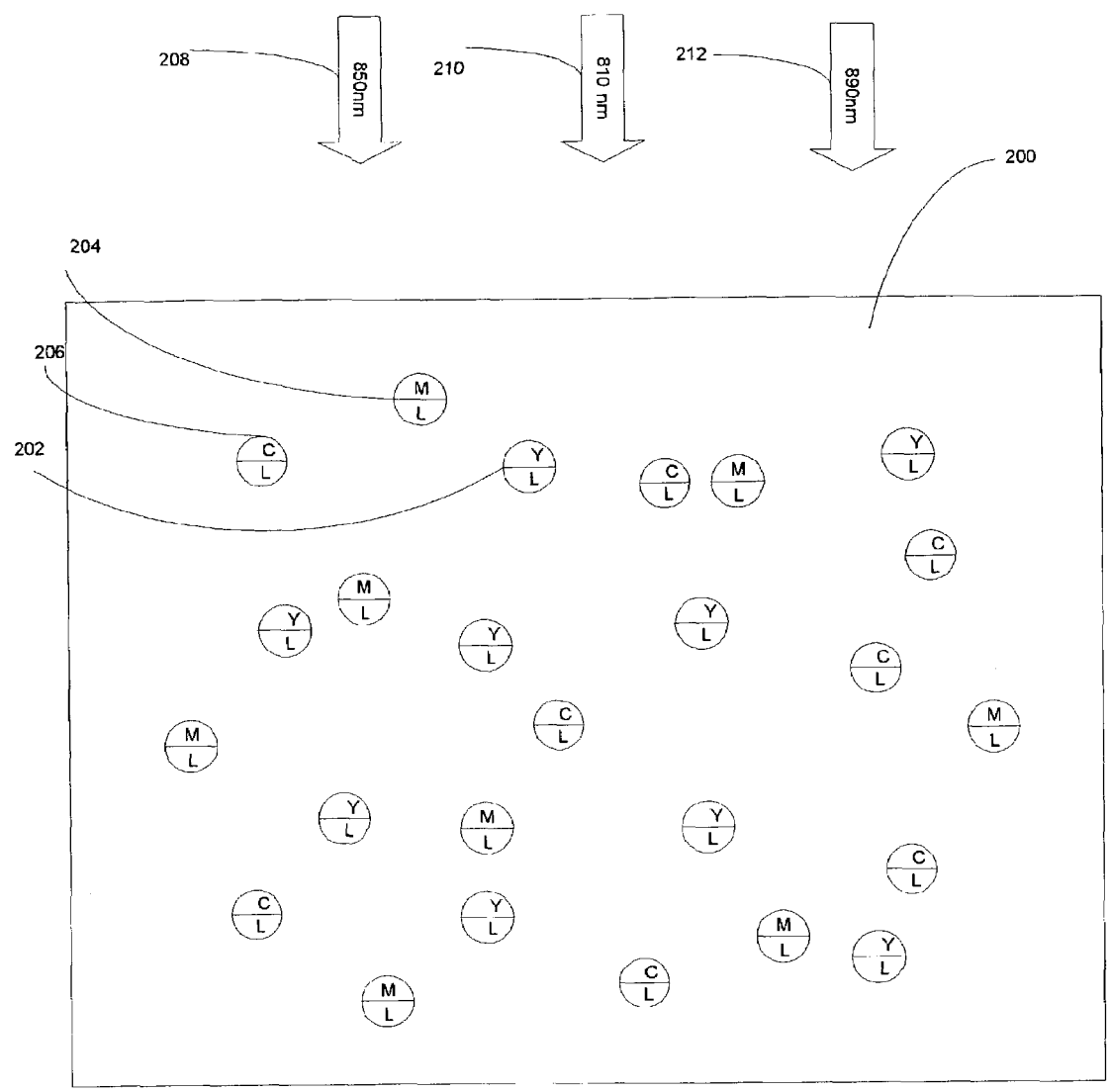
FIG. 4 is a cross sectional view of an imaging layer manufactured, in accordance with one embodiment of the invention.

FIG. 4 is a cross sectional view of an imaging layer 200 manufactured, in accordance with one embodiment of the invention. The imaging layer includes a plurality of particles 202, 204, 206, each particle comprising a pair, respectively, of yellow, cyan, and magenta with an appropriate leuco dye. Note that although FIG. 4 illustrates all of the particles 202, 204, 206 as having substantially uniform size, that is provided merely for illustration and is not required for the invention. In fact, in many embodiments of the invention, the particle size will be random. In addition, FIG. 4 illustrates each particle as having equal, symmetrical portions of leuco dye (shown as "L") and colored IR dye (shown, e.g., as "Y", "M", and "C"), but these are provided entirely for the purpose of illustration, and are not intended to show literally what the particles look like.

As those skilled in the art will appreciate, the image capable layer 200 can be formed as a laminate, a coating, or an adhesive In FIG. 4, first, second, and third lasers 208, 210, 212 each transmit energy at a different wavelength, and only one type of particle 202, 204, 206 will be responsive to a given laser 208, 210, 212. For example, the yellow particle 202 could be responsive only to the first (850 nm) laser 208.

The lasers 208, 210, 212 can be operated in many ways. In a preferred embodiment, each laser is operated sequentially. However, in at least one embodiment, two or more lasers operate at the same time. Furthermore, although FIG. 4 shows that the lasers 208, 210, 212 are disposed along side each other to direct laser energy in separate location, the lasers can, in fact be co-located and/or can direct their energy to the same spot, without affecting the quality or appearance of the full color laser engraving as described here.

Referring again to FIG. 3, in one embodiment, this mix is provided in a carrier where the index of refraction approaches (or equals) that of each of the acrylate matrices. Generally, any polymer having an index of refraction that matches that of the resultant particles and that can hold the particles in suspension is usable as a carrier.

The image capable layer (step 125) has a preset distribution (because of the mixing and blending of steps 100-120) of CYM particles (all preferably transparent), each capable of absorbing specific NIR radiation to achieve the necessary color formation. We also have separation of the CYM imaging centers in that they are each encased in a highly cross-linked acrylate matrix within another "carrier" resin system. Thus, "cross talk" between the CYM centers is minimized, as is contamination and/or chemical mixing of image formers.

Figure 5:
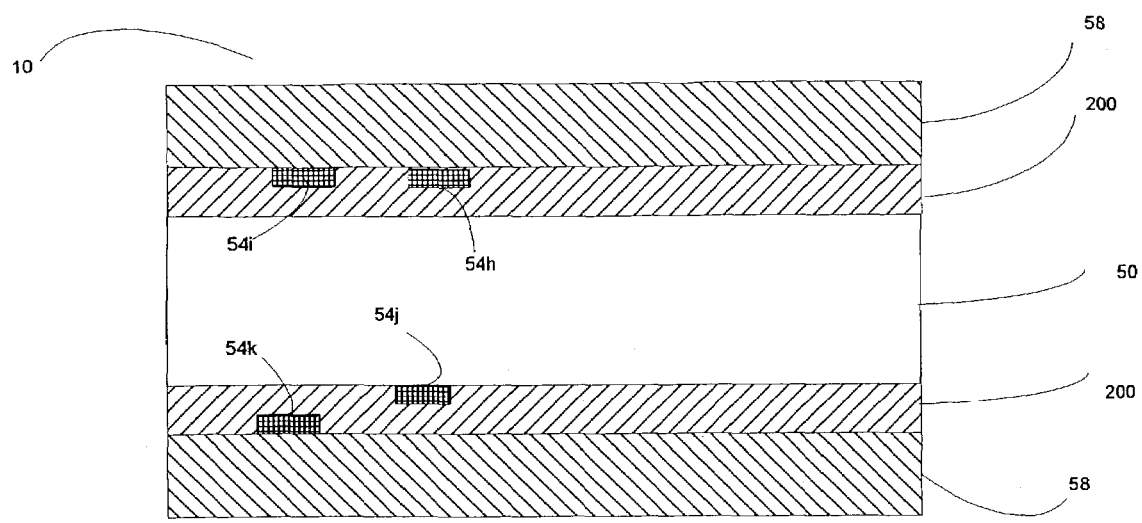
FIG. 5 is a cross sectional view, after laser engraving, of an ID card manufactured using the imaging layer of FIG. 4 and the method of FIG. 3

FIG. 5 is a cross sectional view, after laser engraving, of an ID card manufactured using the imaging layer of FIG. 4 and the method of FIG. 3. In FIG. 5, the image capable layer 200 of FIG. 4 is coupled to the core layer 50 of an ID card 10. Full color information 54h-k is shown as being engraved into the image capable layer 200. It should be noted that overlaminate not required to protect because laser engraving is within the document and not affected by external factors such as abrasion. Overlaminate is provided only if needed or desired for a given application.

A layer of overlaminate 58 is applied over the image capable layer 200. In at least one embodiment, the overlaminate 48 is transparent to laser radiation and can be applied prior to the laser engraving of the image capable layer 200. In another one embodiment, the overlaminate 58 absorbs laser radiation and so is coupled to the image capable layer 200 after the laser engraving occurs.

In one embodiment, the "carrier resin" system is can be solvent cast (e.g., no dissolution of the acrylate matrices), UV—100% solids, or extrudable resin systems. All three can be used to incorporate the imaging layer into a document structure.

CONCLUDING REMARKS

Having described and illustrated the principles of the technology with reference to specific implementations, it will be recognized that the technology can be implemented in many other, different, forms.

Although certain words, languages, phrases, terminology, and product brands have been used herein to describe the various features of the embodiments of the invention, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include the technology detailed in the following applications, the disclosures of which are incorporated herein by reference: Ser. No. 09/747,735, published as US 2003-0038174 A1 (filed Dec. 22, 2000), Ser. No. 09/969,200, now U.S. Pat. No. 6,827,277 (filed Oct. 2, 2001). Also, instead of ID documents, the inventive techniques can be employed with product tags, product packaging, business cards, bags, charts, maps, labels, etc., etc., particularly those items including engraving of an over-laminate structure. The term ID document is broadly defined herein to include these tags, labels, packaging, cards, etc. In addition, while some of the examples above are disclosed with specific core components, it is noted that-laminates can be sensitized for use with other core components.

To provide a comprehensive disclosure without unduly lengthening the specification, applicant hereby incorporates by reference each of the patents and patent applications referenced above.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

The invention claimed is:

1. A method of making a material comprising:
   selecting a first dye comprising a first material associated with a first color;
   combining a second dye with the first dye to form a first particle having a first size, the second dye comprising a second material responsive to a first predetermined quantity of a first wavelength of laser radiation;
   adding the first particle to a carrier material, wherein directing the predetermined first quantity of first laser radiation having the first predetermined wavelength towards a portion of the carrier material containing the first particle creates in the portion of the carrier material a visible region having the first color.

2. The method of claim 1 wherein the first color is at least one of cyan, magenta, or yellow.

3. The method of claim 1 wherein the first dye comprises a leuco dye.

4. The method of claim 1 wherein the first dye changes to the first color when the particle is excited by the first predetermined wavelength of laser radiation.

5. The method of claim 1 wherein the first dye does not change color if the particle is excited by a wavelength of laser radiation that is substantially different from the first predetermined wavelength of laser radiation.

6. The method of claim 1 wherein the first predetermined wavelength of radiation comprises a wavelength in a non-visible spectrum.

7. The method of claim 6 wherein the first predetermined wavelength of radiation comprises a wavelength in at least one of the ultraviolet, infrared, and near infrared spectrum.

8. The method of claim 7 wherein the first predetermined wavelength is within the range of 800-900 nm.

9. The method of claim 1 wherein the carrier material has an index of refraction and wherein the method further comprises selecting at least one of the first or the second dyes to have an index of refraction that substantially matches the index of refraction of the carrier material.

10. The method of claim 1 wherein the carrier holds the first particle in suspension.

11. The method of claim 1 wherein the carrier is formed into at least one of a laminate, a coating, an adhesive, or a core material.

12. The method of claim 1 wherein the carrier is substantially transparent.

13. The method of claim 1 wherein the first particle is substantially transparent until the first particle is irradiated with a sufficient quantity of laser radiation at the predetermined first wavelength.

14. The method of claim 1 wherein thickness of the first particle size ranges between 10 to 20 microns.

15. The method of claim 1 further comprising creating an identification document comprising the carrier material.

16. A method of making a material comprising:
    selecting a first dye comprising a first material associated with a first color:
    combining a second dye with the first dye to form a first particle having a first size, the second dye comprising a second material responsive to a first predetermined quantity of a first wavelength of laser radiation;
    adding the first particle to a carrier material, wherein directing the predetermined first quantity of first laser radiation having the first predetermined wavelength towards a portion of the carrier material containing the first particle creates in the portion of the carrier material a visible region having the first color;
    creating a grindable matrix comprising the first and the second dyes; grinding the matrix to the first particle size;
    constructing an acrylate matrix comprising the first and the second dyes;
    casting the acrylate matrix onto a release web at a predetermined thickness;
    removing the acrylate matrix from the release web;
    curing the casted acrylate matrix into a brittle matrix; and
    providing the brittle matrix as the grindable matrix.

17. A method of making a material comprising:
    selecting a first dye comprising a first material associated with a first color;
    combining a second dye with the first dye to form a first particle having a first size, the second dye comprising a second material responsive to a first predetermined quantity of a first wavelength of laser radiation;
    adding the first particle within a carrier material, wherein directing the predetermined first quantity of first laser radiation having the first predetermined wavelength towards a portion of the carrier material containing the first particle creates in the portion of the carrier material a visible region having the first color;
    selecting a third dye comprising a third material associated with a second color, the second color being substantially different than the first color;
    combining a fourth dye with the third dye to form a second particle having a second size, the fourth dye comprising a fourth material responsive to a second predetermined quantity of a second predetermined wavelength of laser radiation, the second predetermined wavelength being substantially different from the first predetermined wavelength; and
    adding the second particle within the carrier material, wherein directing the second predetermined quantity of the second predetermined wavelength of laser radiation having the second predetermined wavelength towards a portion of the carrier material containing the second particle creates in the portion of the carrier material a visible region having the second color.

18. The method of claim 17 further comprising selecting the fourth dye so that the second predetermined wavelength does not substantially overlap with the first predetermined wavelength.

19. The method of claim 17 wherein the first and the second particles are disposed within substantially the same portion of the carrier material.

20. The method of claim 17 wherein the first laser radiation is directed towards the carrier material at a substantially different time than the second laser radiation.

21. The method of claim 17 wherein the first laser radiation is directed towards the carrier material at substantially the same time as the second laser radiation.

22. The method of claim 17 wherein the first and the second laser radiations are directed towards substantially the same area of the carrier material.

23. The method of claim 17, further comprising:
    creating a first grindable matrix comprising the first and the second dyes;
    grinding the first grindable matrix to the first particle size;

creating a second grindable matrix comprising the third and the fourth dyes;

grinding the second grindable matrix to the second particle size;

mixing a first portion of the first particles with a second portion of the second particles; and adding the mix of first and second particles to the carrier material.

24. The method of claim 17 wherein the carrier material comprises an image capable layer, with the first particle and the second particle provided within the image capable layer.

25. A method of making an identification document having images of at least two different colors formed thereon by laser radiation, the method comprising:

providing a first colored dye having a first color;

combining the first colored dye with a first laser sensitive dye to form a first particle, the first laser sensitive dye being responsive to a first predetermined wavelength of laser radiation;

providing a second colored dye having a second color substantially different from the first color;

combining the second colored dye with a second laser sensitive dye to form a second particle, the second laser sensitive dye being responsive to a second predetermined wavelength of laser radiation;

providing a carrier material including the first and the second particles therein;

forming at least a portion of an identification document using the carrier material; directing laser radiation at the first predetermined wavelength onto at least one location on the carrier material to form thereon an image having the first color; and directing laser radiation at the second predetermined wavelength onto at least one location on the carrier material to form thereon an image having the second color.

26. The method of claim 25 wherein the carrier material comprises an image capable layer, with the first and the second particles provided within the image capable layer.

27. An identification document, comprising:

a first information-bearing layer, the first information-bearing layer displaying information in a first color; and a particle disposed within the first information-bearing layer, the particle comprising a combination of a first dye having a first color and a second dye combined with the first dye to form a first particle, the second dye comprising a material responsive to a first predetermined wavelength of laser radiation;

wherein the information is formed on the first information-bearing layer by exposing the particle to the first predetermined wavelength of laser radiation.

28. The identification document of claim 27, wherein the first information-bearing layer is coupled to a second layer.

29. The identification document of claim 28, wherein the first information-bearing layer is substantially transparent and the second layer is visible through at least a portion of the first information-bearing layer.

30. The identification document of claim 28 further comprising a third layer disposed over the first information-bearing layer and the second layer, the third layer selected to permit the information on the first information-bearing layer to be perceived.

31. The identification document of claim 30 wherein the third layer is transparent to the first predetermined wavelength of laser radiation.

32. The identification document of claim 30, wherein the third layer is not transparent to the first predetermined wavelength of laser radiation.

33. A method of making a material comprising:

selecting a first dye pair having a first color;

selecting a second dye pair having a second, different color;

wherein the first dye pair includes one dye combined with another dye, the another dye having at least one component that is responsive to a first wavelength of laser radiation, wherein the second dye pair includes one dye combined with another dye, the another dye having at least one component that is responsive to a second, different wavelength of laser radiation, forming a mixture including the first dye pair and the second dye pair;

adding the mixture to a carrier material, wherein directing the first wavelength of laser radiation toward a first portion of the carrier material containing the first dye pair creates in the first portion a visible region having the first color, and wherein directing the second, different wavelength of laser radiation toward a second portion of the carrier material containing the second dye pair creates in the second portion a visible region having the second, different color.

34. The method of claim 33 wherein the first portion and the second portion have at least some overlapping regions.

35. An identification document comprising:

at least one imaging layer capable of having at least one image formed therein, the at least one imaging layer comprising:

a plurality of particles, each particle capable of generating a specific color and having a first portion of a first dye including a material associated with the specific color and a second portion of a second dye including a material capable of absorbing radiation energy provided in a predetermined range of wavelengths to excite the second dye sufficiently to provide localized temperatures to transform the first dye to a colored state to form a visible pixel in the specific color, wherein a first set of particles absorbs radiation energy provided in a first predetermined range of wavelengths and creates a first specific color and at least a second set of particles absorbs radiation energy provided in a second predetermined range of wavelengths different from the first predetermined range of wavelengths and creates a second specific color different from the first specific color, the first set of particles and the at least second set of particles excited simultaneously or serially with application of the first and second predetermined ranges of wavelengths.

* * * * *